US011776402B2

(12) United States Patent
Agarwal et al.

(10) Patent No.: US 11,776,402 B2
(45) Date of Patent: Oct. 3, 2023

(54) FORECASTING VEHICLE LOCATION OCCUPANCY

(71) Applicant: MOTIONAL AD LLC, Boston, MA (US)

(72) Inventors: Shaurya Agarwal, Boston, MA (US); Ayman Alalao, Cambridge, MA (US); Tyler Hendrickson, Tewksbury, MA (US); Alexander Steinwald, Evanston, IL (US)

(73) Assignee: Motional AD LLC, Boston, MA (US)

( * ) Notice: Subject to any disclaimer, the term of this patent is extended or adjusted under 35 U.S.C. 154(b) by 72 days.

(21) Appl. No.: 17/361,547

(22) Filed: Jun. 29, 2021

(65) Prior Publication Data
US 2022/0415173 A1 Dec. 29, 2022

(51) Int. Cl.
*G08G 1/14* (2006.01)
*B60W 60/00* (2020.01)
(Continued)

(52) U.S. Cl.
CPC ......... *G08G 1/143* (2013.01); *B60W 50/0097* (2013.01); *B60W 60/001* (2020.02); *G01C 21/3415* (2013.01); *G08G 1/0129* (2013.01); *G08G 1/096725* (2013.01); *G08G 1/144* (2013.01); *B60W 30/06* (2013.01); *B60W 2420/52* (2013.01); *B60W 2554/406* (2020.02); *B60W 2555/20* (2020.02); *G08G 1/04* (2013.01)

(58) Field of Classification Search
CPC ............... G08G 1/143; G08G 1/0129; G08G 1/096725; G08G 1/144; G08G 1/04; B60W 50/097; B60W 60/001; B60W 30/06; B60W 2420/52; B60W 2554/406; B60W 2555/20; G01C 21/3415
See application file for complete search history.

(56) References Cited

U.S. PATENT DOCUMENTS

2011/0057813 A1* 3/2011 Toledo .................. B60W 10/20
340/425.5
2014/0058711 A1* 2/2014 Scofield ................. G08G 1/143
703/6
(Continued)

FOREIGN PATENT DOCUMENTS

WO WO 2016/174670 11/2016

OTHER PUBLICATIONS

[No Author Listed], "Sae: Surface Vehicle Recommended Practice, Taxonomy and Definitions for Terms Related to Driving Automation Systems for On-Road Motor Vehicles," SAE International, Sep. 30, 2016, 30 pages.

*Primary Examiner* — Dale W Hilgendorf
(74) *Attorney, Agent, or Firm* — Fish & Richardson P.C.

(57) ABSTRACT

Among other things, techniques are described for forecasting occupancy of a vehicle location. This includes receiving, by at least one processor, status information of a parking location the status information representing an availability of the parking location; predicting, by the at least one processor, a future status of the parking location based on the received status information; determining, by the at least one processor, a destination based on the predicted future status of the parking location; and providing, by the at least one processor, the predicted future status to a controller of a vehicle for controlling the vehicle to drive to the destination.

29 Claims, 11 Drawing Sheets

(51) Int. Cl.
*B60W 50/00* (2006.01)
*G01C 21/34* (2006.01)
*G08G 1/01* (2006.01)
*G08G 1/0967* (2006.01)
*B60W 30/06* (2006.01)
*G08G 1/04* (2006.01)

(56) References Cited

U.S. PATENT DOCUMENTS

| | | | |
|---|---|---|---|
| 2014/0176348 A1* | 6/2014 | Acker, Jr. | G08G 1/04 340/932.2 |
| 2014/0266801 A1* | 9/2014 | Uppal | G08G 1/0133 340/932.2 |
| 2015/0029041 A1* | 1/2015 | Liu | G08G 1/143 340/932.2 |
| 2016/0163197 A1* | 6/2016 | Levy | G08G 1/144 340/932.2 |
| 2016/0180712 A1* | 6/2016 | Rosen | G08G 1/147 705/5 |
| 2016/0196747 A1* | 7/2016 | Tsyrklevich | G01C 21/3667 701/532 |
| 2017/0138746 A1* | 5/2017 | Eliassi | G01C 21/3476 |
| 2017/0191849 A1* | 7/2017 | Agam | G08G 1/148 |
| 2017/0316690 A1* | 11/2017 | Charles | G08G 1/148 |
| 2017/0330144 A1* | 11/2017 | Wakim | H04W 4/023 |
| 2018/0107222 A1 | 4/2018 | Fairfield et al. | |
| 2018/0286238 A1* | 10/2018 | Linder | G06Q 10/04 |
| 2020/0011671 A1* | 1/2020 | Puri | G08G 1/141 |
| 2020/0242924 A1* | 7/2020 | Publicover | G08G 1/087 |
| 2020/0357281 A1* | 11/2020 | Agarwal | G08G 1/144 |
| 2021/0035450 A1* | 2/2021 | Gao | H04W 4/40 |
| 2021/0133603 A1* | 5/2021 | Zhu | G06N 5/04 |

* cited by examiner

FORECASTING VEHICLE LOCATION OCCUPANCY

FIELD OF THE INVENTION

This description relates to occupancy of vehicle locations, e.g., parking locations.

BACKGROUND

Occupancy of parking locations changes over time. Sometimes a vehicle travels to a destination without assurance that a parking location is available. Furthermore, sometimes the vehicle arrives at the destination only to wait in traffic (e.g., waiting in a line of vehicles) for an available parking location. Not only does this delay the arrival of the vehicle at the destination but passengers within the vehicle waiting to be dropped-off and/or passengers waiting to be picked-up must also wait. In some cases, a nearby parking location would have sufficed and the vehicle could have reached the destination sooner.

DETAILED DESCRIPTION

Figure 1:
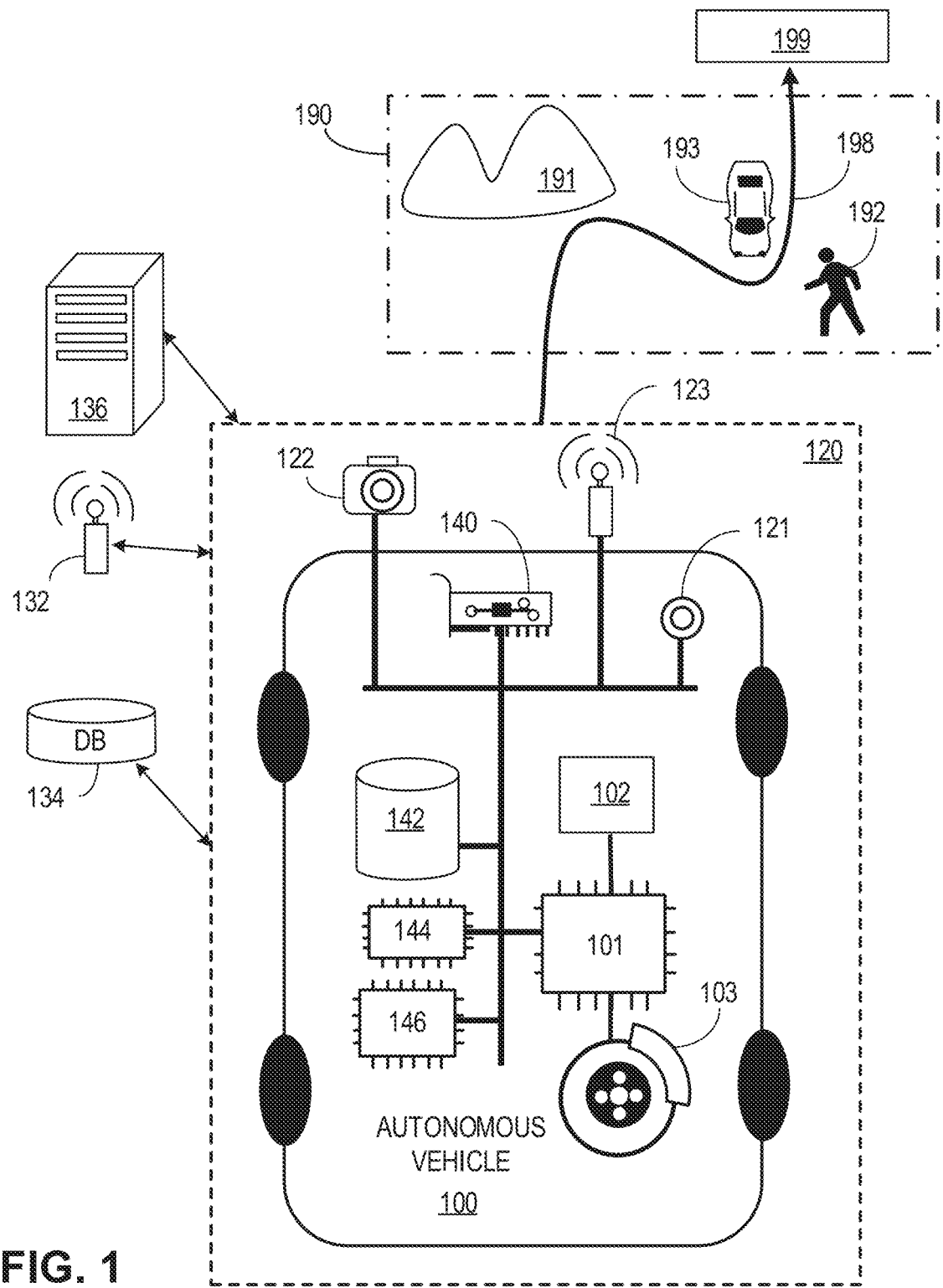
FIG. 1 shows an example of an autonomous vehicle (AV) having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. For example, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Planning
6. Forecasting Occupancy General Overview A future status (e.g., an occupancy, availability, and/or accessibility) of a pick-up location and/or a drop-off location can be predicted (e.g., probabilistically forecast) to improve passenger safety and ride comfort. For example, a first vehicle passing by the parking location acquires a status of the parking location (e.g., is it available, it is obstructed, does it exist, etc.) and relays this status information to a remote server or a second vehicle heading to the parking location. In this scenario, the second vehicle can determine if changing a destination of the second vehicle to a different parking location is necessary (e.g., parking location is occupied/unavailable, parking location is blocked/inaccessible, etc.) and/or beneficial (e.g., high levels of congestion near parking location, etc.).

Among other things, an occupancy forecasting system improves situational awareness of a vehicle as it approaches a destination. For example, by knowing where the congestion is, the vehicle may redirect around the congestion to a different parking location within walking distance to the original parking location. This, in turn, reduces the resources consumed by the vehicle that would otherwise be expended waiting for a particular parking location. Additionally, the vehicle can discharge passengers and pick up different passengers more quickly, thereby reducing the wait time of passengers. The technology accommodates user preferences by requesting permission from passengers before changing the parking location. Furthermore, congestion within a radius of busy parking locations is reduced and wait times are reduced by not needing to wait for an available parking location to become available.

System Overview

FIG. 1 shows an example of a vehicle 100 having autonomous capability.

As used herein, the term "passenger" refers to a passenger riding within the vehicle (e.g., enroute to a destination for drop-off) and/or a passenger awaiting pick-up. In some examples, a passenger is a pedestrian or a group of pedestrians (e.g., family, school group, etc.).

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to. On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, BLUETOOTH®, satellite, cellular, optical, near field, infrared, or radio interfaces. The communication interfaces transmit data from a remotely located database 134 to AV system 120. In an embodiment, the remotely located database 134 is embedded in a cloud computing environment. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the vehicle 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the vehicle 100, or to another AV. This enables the passenger's privacy level to specify which other entities are allowed to receive data about the passenger's actions or other data associated with the passenger.

AV Architecture

Figure 2:
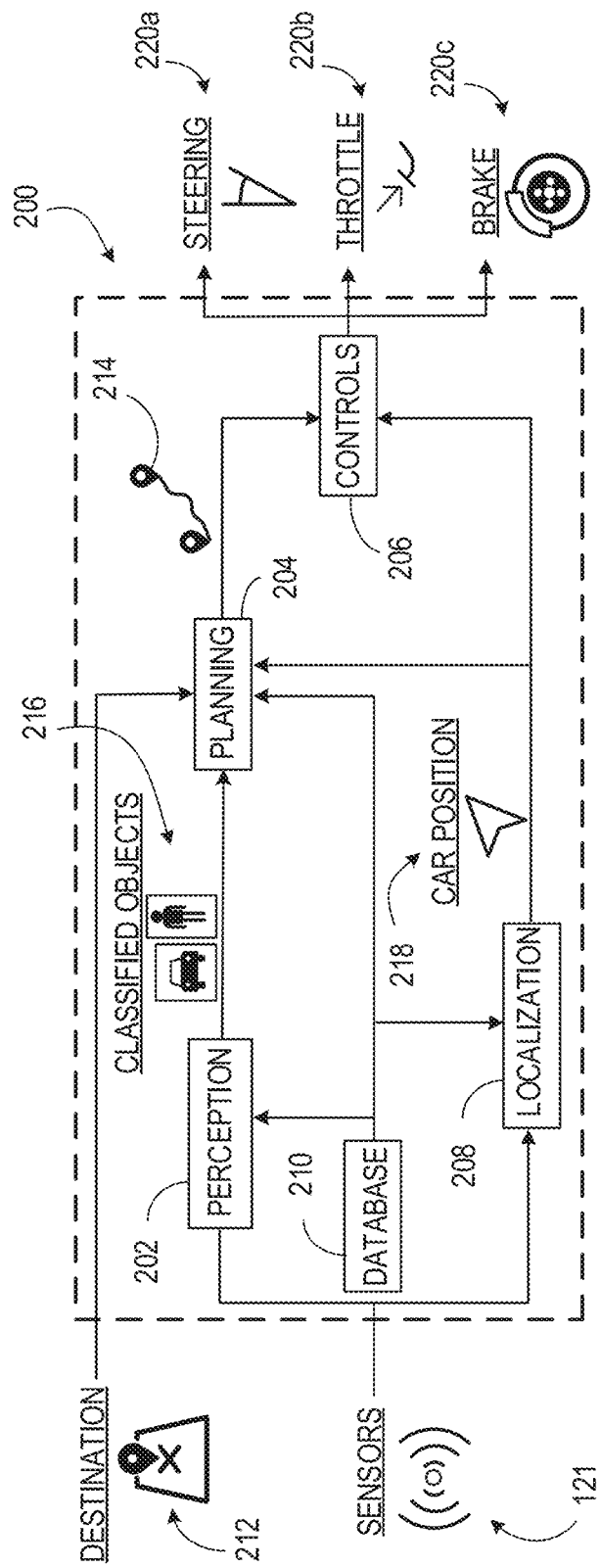
FIG. 2 shows an example architecture for an AV.

FIG. 2 shows an example architecture 200 for an AV (e.g., the vehicle 100 shown in FIG. 1). The architecture 200 includes a perception system 202 (sometimes referred to as a perception circuit), a planning system 204 (sometimes referred to as a planning circuit), a control system 206 (sometimes referred to as a control circuit), a localization system 208 (sometimes referred to as a localization circuit), and a database system 210 (sometimes referred to as a database circuit). Each system plays a role in the operation of the vehicle 100. Together, the systems 202, 204, 206, 208, and 210 can be part of the AV system 120 shown in FIG. 1. In some embodiments, any of the systems 202, 204, 206, 208, and 210 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 202, 204, 206, 208, and 210 is sometimes referred to as a processing circuit (e.g., computer hardware, computer software, or a combination of the two). A combination of any or all of the systems 202, 204, 206, 208, and 210 is also an example of a processing circuit.

In use, the planning system 204 receives data representing a destination 212 and determines data representing a trajectory 214 (sometimes referred to as a route) that can be traveled by the vehicle 100 to reach (e.g., arrive at) the destination 212. In order for the planning system 204 to determine the data representing the trajectory 214, the planning system 204 receives data from the perception system 202, the localization system 208, and the database system 210.

The perception system 202 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 216 is provided to the planning system 204.

The planning system 204 also receives data representing the AV position 218 from the localization system 208. The localization system 208 determines the AV position by using data from the sensors 121 and data from the database system 210 (e.g., a geographic data) to calculate a position. For example, the localization system 208 uses data from a GNSS (Global Navigation Satellite System) sensor and geographic data to calculate a longitude and latitude of the AV. In an embodiment, data used by the localization system 208 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 206 receives the data representing the trajectory 214 and the data representing the AV position 218 and operates the control functions 220a-c (e.g., steering, throttling, braking, ignition) of the AV in a manner that will cause the vehicle 100 to travel the trajectory 214 to the destination 212. For example, if the trajectory 214 includes a left turn, the control system 206 will operate the control functions 220a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 3:
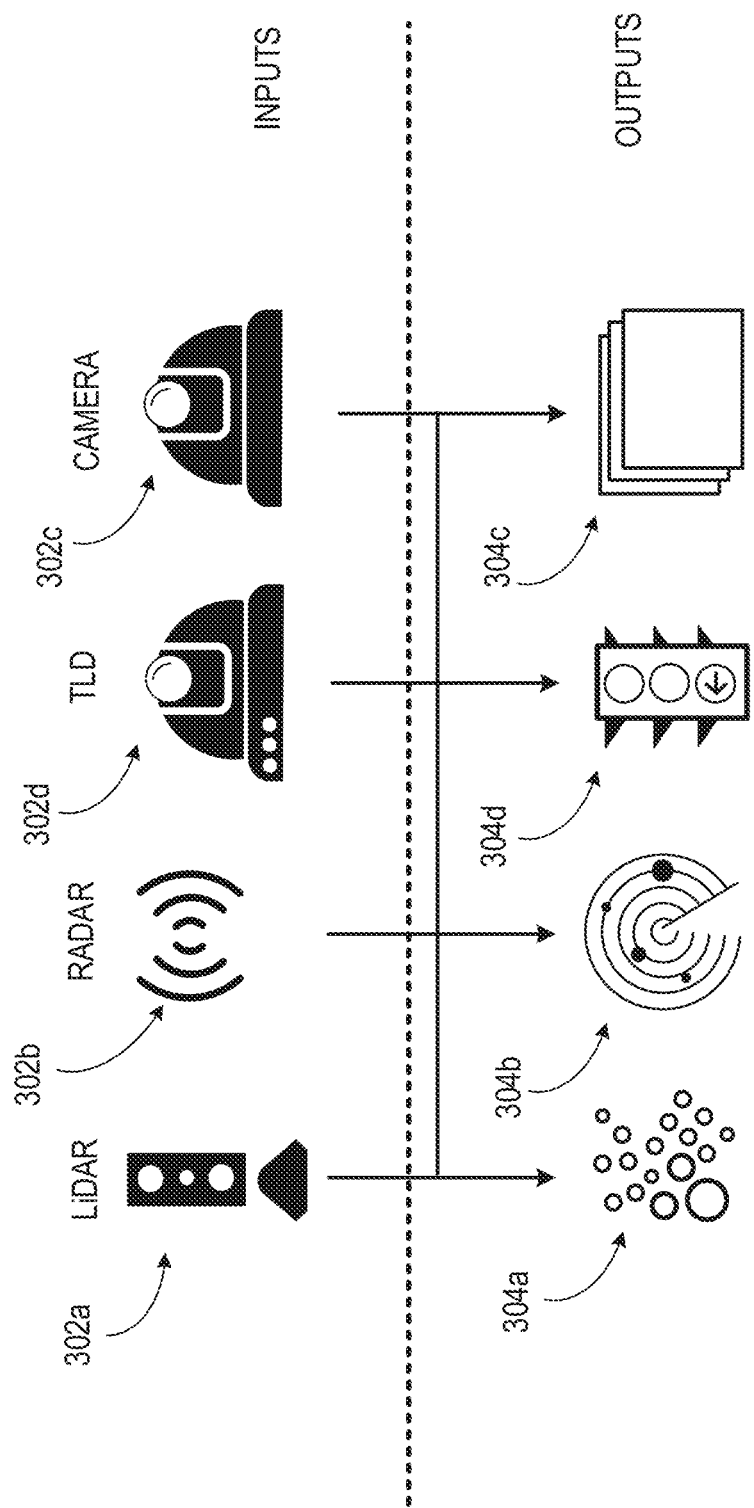
FIG. 3 shows an example of inputs and outputs that can be used by a perception system.

FIG. 3 shows an example of inputs 302a-d (e.g., sensors 121 shown in FIG. 1) and outputs 304a-d (e.g., sensor data) that is used by the perception system 202 (FIG. 2). One input 302a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 304a. For example, LiDAR data is collections of 3D or 2D points (also known as a point clouds) that are used to construct a representation of the environment 190.

Another input 302b is a RADAR system. RADAR is a technology that uses radio waves to obtain data about nearby physical objects. RADARs can obtain data about objects not within the line of sight of a LiDAR system. A RADAR system produces RADAR data as output 304b. For example, RADAR data are one or more radio frequency electromagnetic signals that are used to construct a representation of the environment 190.

Another input 302c is a camera system. A camera system uses one or more cameras (e.g., digital cameras using a light sensor such as a charge-coupled device [CCD]) to obtain information about nearby physical objects. A camera system produces camera data as output 304c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 302d is a traffic light detection (TLD) system. A TLD system uses one or more cameras to obtain information about traffic lights, street signs, and other physical objects that provide visual navigation information. A TLD system produces TLD data as output 304d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 304a-d are combined using a sensor fusion technique. Thus, either the individual outputs 304a-d are provided to other systems of the vehicle 100 (e.g., provided to a planning system 204 as shown in FIG. 2), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Path Planning

Figure 4:
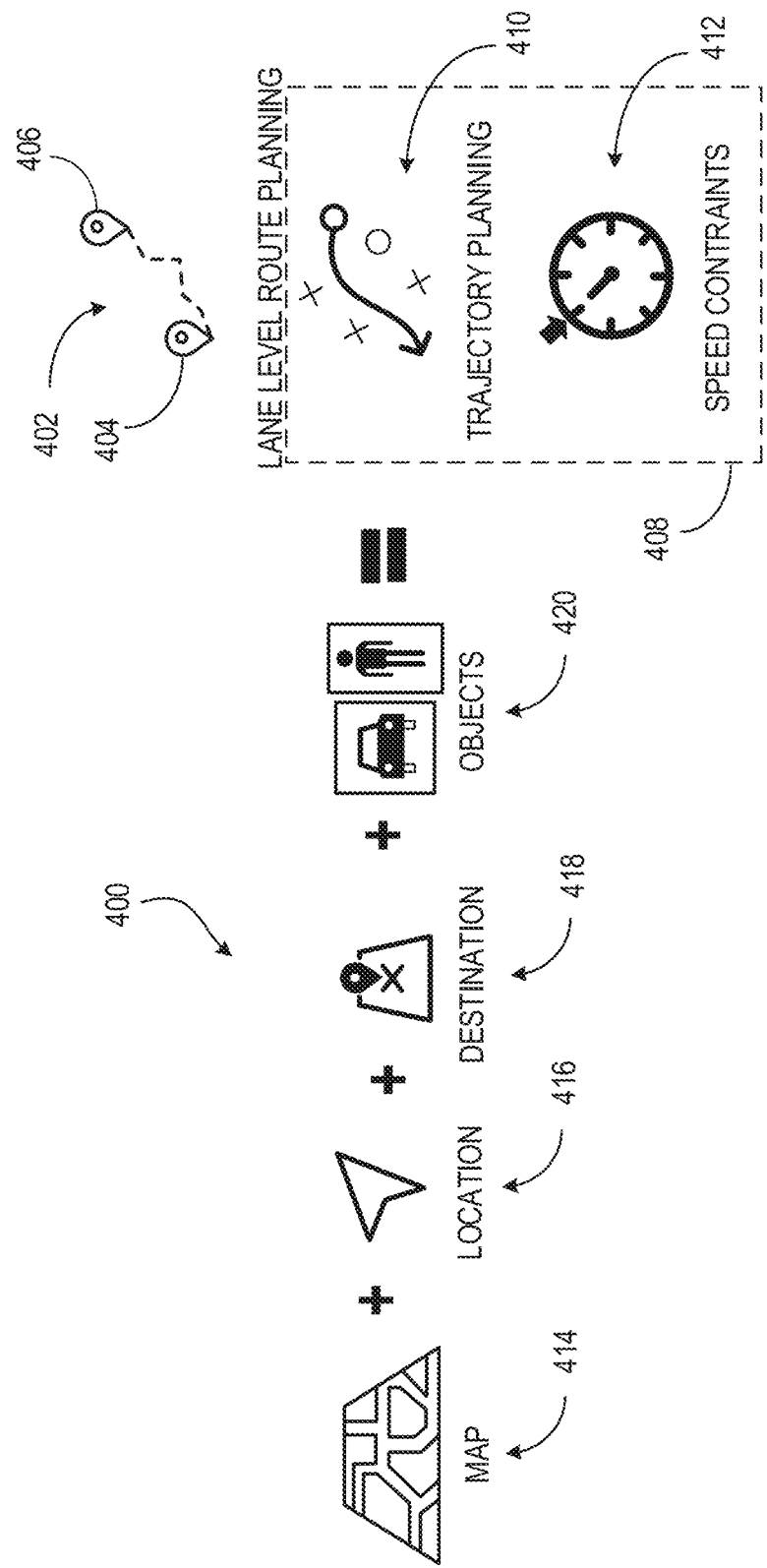
FIG. 4 shows a block diagram of the relationships between inputs and outputs of a planning system.

FIG. 4 shows a block diagram 400 of the relationships between inputs and outputs of a planning system 204 (e.g., as shown in FIG. 2). In general, the output of a planning system 204 is a route 402 from a start point 404 (e.g., source location or initial location), and an end point 406 (e.g., destination or final location). The route 402 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 402 includes "off-road" segments such as unpaved paths or open fields.

In addition to the route 402, a planning system also outputs lane-level route planning data 408. The lane-level route planning data 408 is used to traverse segments of the route 402 based on conditions of the segment at a particular time. For example, if the route 402 includes a multi-lane highway, the lane-level route planning data 408 includes trajectory planning data 410 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 408 includes speed constraints 412 specific to a segment of the route 402. For example, if the segment includes pedestrians or unexpected traffic, the speed constraints 412 may limit the vehicle 100 to a travel speed slower than an expected speed, e.g., a speed based on speed limit data for the segment.

In an embodiment, the inputs to the planning system 204 includes database data 414 (e.g., from the database system 210 shown in FIG. 2), current location data 416 (e.g., the AV position 218 shown in FIG. 2), destination data 418 (e.g., for the destination 212 shown in FIG. 2), and object data 420 (e.g., the classified objects 216 as perceived by the perception system 202 as shown in FIG. 2). In some embodiments, the database data 414 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Forecasting Occupancy

Figure 5:
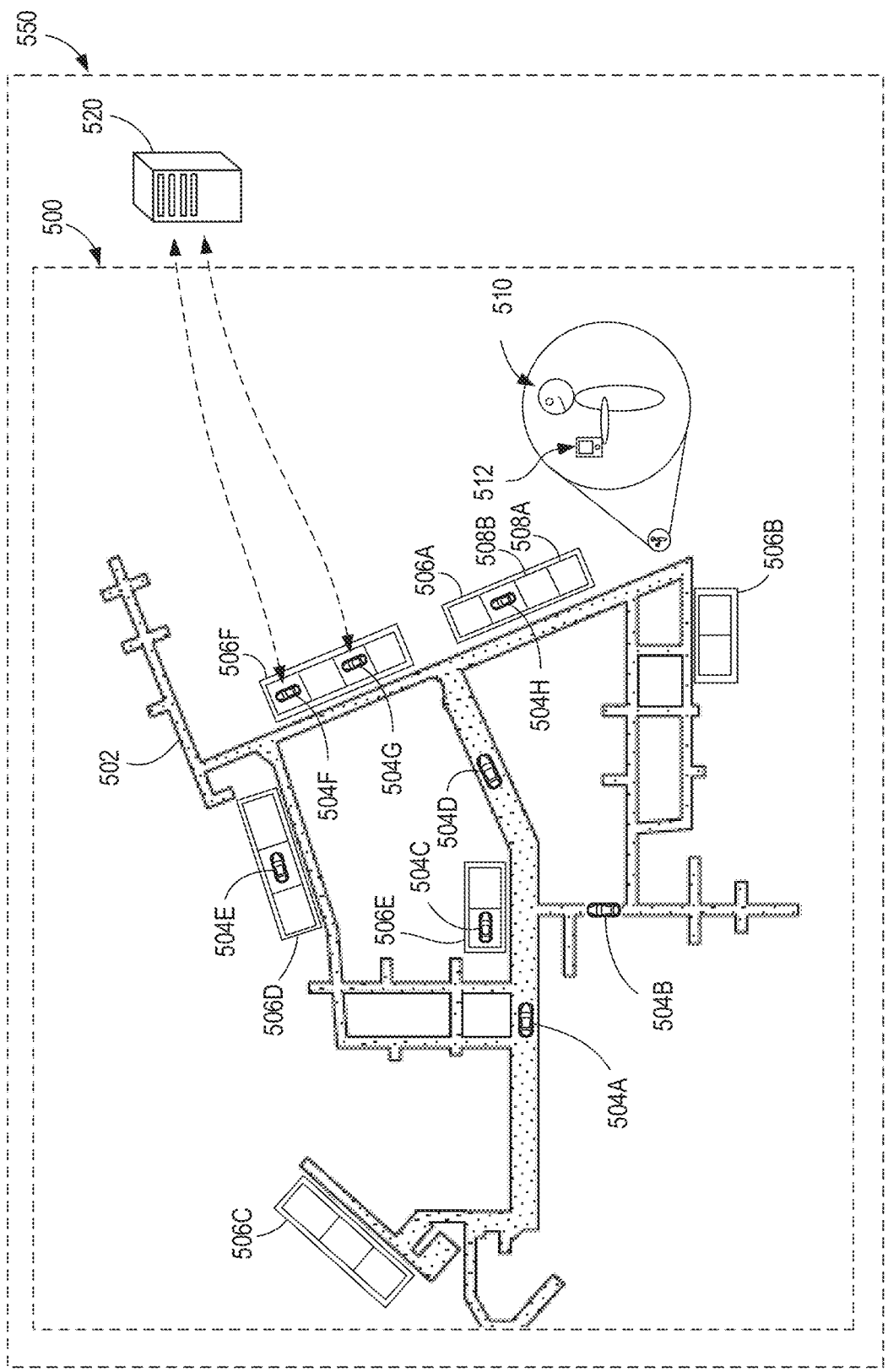
FIG. 5 shows an environment of an occupancy forecasting system.

FIG. 5 shows an environment 500 of an occupancy forecasting system 550. The environment 500 includes vehicles 504A-504H (collectively "vehicles 504") that drive on roads 502. In an embodiment, the vehicles 504 are the same as, or similar to, the vehicle 100 described with reference to FIG. 1. In an embodiment, any or all of the vehicles 504 are autonomous or semi-autonomous.

The environment 500 includes one or more parking zones 506A-506F (collectively "parking zones 506") which include one or more parking locations 508A, 508B (collectively "parking locations 508"), however some parking locations 508 are not explicitly labeled in FIG. 5 for brevity. A parking location 508 is a place or location where a vehicle 504 can at least temporarily stop to pick up and/or drop off passengers. Sometimes this parking location 508 is referred to as a "PuDo location" or Pick-up-Drop-off location. In some cases, the parking location 508 is used for short-term parking (e.g., one day or one week) or long-term parking (e.g., one month or one year, typically used for long-term storage of a vehicle 504). Similarly, a parking zone 506 is a set of parking locations 508 and defines a boundary of the parking locations 508.

In some examples, a parking zone 506 includes a single parking location 508, and in other examples, a parking zone 506 includes more than one parking location 508 (e.g., 2-10, etc.). In most examples, the parking locations 508 are adjacent to the roads 502 (e.g., as typical in urban environments) such that they are accessible by vehicles 504 and viewable by vehicles 504 passing by the parking locations 508. In some examples, a parking zone 506 is a parking lot or parking garage with many parking locations 508 (e.g., 50-100 parking locations).

In an embodiment, parking zones 506 and parking locations 508 are pre-defined and stored in a database or map and hosted by a server 520. In the example shown in FIG. 5, the server 520 and some or all of the vehicles 504 within the environment 500 are part of a vehicle network defining an occupancy forecasting system 550. In this example, the occupancy forecasting system 550 includes some or all of the vehicles 504 and the server 520 such that vehicles 504 are able to directly communicate with each other and/or directly communicate with the server 520. Computational tasks described with reference to a specific vehicle 504 are also performable by the server 520 and/or other vehicles 504 within the occupancy forecasting system 550.

In an embodiment, a map annotation process assembles the database by generating location information for all permissible parking zones 506 and parking locations 508 within an environment 500. In this context, "permissible" means that the parking locations 508 are available for a vehicle 504 to use for at least some period of time throughout the year. In some examples, the map annotation process includes a manual process that involves a human annotator to define the individual parking zones 506 and individual parking locations 508 based on aerial satellite imagery or drive-by LiDAR and/or camera images of the environment 500.

In some examples, the parking locations 508 exclude places where it is illegal to park a vehicle 504 (e.g., within fire zones, blocking fire hydrants, within cross-walks, within intersections, blocking entries, etc.). In this example, legality information is queried from a system associated with a local zoning service (e.g., a group that maintains a listing of laws, rules, and/or regulations associated with vehicle movement in an area such as a city, state, etc.). The database contains location information for each of the parking zones 506 and each of the parking locations 508 within the environment 500.

In an example, a passenger 510 within the environment 500 requests a ride from a first location (e.g., a pick-up location) to a second location (e.g., a drop-off location) using an app (e.g., a mobile application) on a mobile device 512. In this example, the first location is the current location of the passenger 510 as determined by a GPS receiver within the mobile device 512. Once the passenger 510 requests a vehicle 504 by responding to a query via the app (e.g., via a user interface of the mobile device 512 such as a touch screen), the app, in turn, causes the mobile device 512 to transmit a request to the vehicle 504 within the occupancy forecasting system 550 (e.g., vehicle 504A) to drive to the first location (e.g., via the roads 502) and pick up the passenger 510. In some examples, the app causes the mobile device 512 to automatically select a vehicle 504 closest to the passenger 510 (e.g., vehicle 504A specifically via an instruction from one or more processors of the occupancy forecasting system 550).

In an embodiment, the app causes the mobile device 512 to display a location of all vehicles 504 within the environment 500 and enables the passenger 510 to select (e.g., via the user interface of the mobile device 512) a particular vehicle 504A within the occupancy forecasting system 550. In some examples, the app enables the passenger 510 to select a particular vehicle 504A (e.g., via the user interface) based on a number of passengers 510 the vehicle can accommodate (e.g., 1-7 passengers), or based on a luxury level of the vehicle 504. In the following examples, it is assumed that the occupancy forecasting system 550 and/or the passenger 510 has selected vehicle 504A as the vehicle 504.

In an embodiment, the processors are components of the occupancy forecasting system 550. In some examples, the processors are physically part of the mobile device 512, the server 520, and/or any or all of the vehicles 504 within the occupancy forecasting system 550. In some examples, information is processed in part by a first processor within a vehicle 504 and provided to a second processor within the server 520 to finish a computational task. In this example, a general reference to the occupancy forecasting system 550 includes executing some or all of the processing steps on any or all of the one or more processors within the mobile device 512, the server 520, and/or the vehicles 504 operating within the network of the occupancy forecasting system 550.

In an embodiment, the occupancy forecasting system 550 determines the closest parking location 508 to the passenger 510 based on the current location of the passenger 510 as determined by a GPS receiver of the mobile device 512. In this example, the occupancy forecasting system 550 determines that the particular parking location 508A is the closest parking location 508 to the passenger 510 and defines the particular parking location 508A as the pick-up location 508. In turn, the occupancy forecasting system 550 transmits information to the mobile device 512 causing the mobile device 512 to display an indication that the determined closest parking location 508 is the particular parking location 508A and the passenger 510 should expect to be picked-up at the parking location 508A by the particular vehicle 504A. In this example, a destination of the vehicle 504A is the determined pick-up location at the parking location 508A.

In an embodiment, the destination of the vehicle 504A is determined based on a preferred parking location of the passenger 510. For example, the passenger 510 indicates a passenger preference for a particular parking location 508A (and/or a particular parking zone 506A). In some examples, the vehicle 504A increases a tolerance for wait time or congestion based on the parking location passenger preference in order to accommodate the parking preference. For example, the vehicle 504A will wait in traffic to arrive at the particular parking location 508A rather than change the destination to a different parking location (e.g., parking location 508B).

While the above paragraphs refer to an example where parking location 508A is specifically determined/selected to be the pick-up location of the passenger 510, in other examples, the occupancy forecasting system 550 determines that any of the parking locations 508 within a particular parking zone 506A can be the pick-up location of the passenger 510. In this example, the occupancy forecasting system 550 determines the pick-up location of the passenger 510 based on whether any of the parking locations 508 are unavailable and/or inaccessible when the vehicle 504A arrives at the particular parking zone 506A. For example, the occupancy forecasting system 550 determines that parking zone 506A is closest to the passenger 510 and transmits information to the vehicle 504A indicating that the parking zone 506A (and the parking locations within the parking zone 506A) is the closest parking zone to the passenger 510. In turn, the occupancy forecasting system 550 transmits information to the mobile device 512 causing the mobile device 512 to display an indication that the determined parking zone 506A and/or any of the parking locations 508 of the parking zone 506A may be the pick-up location. In this example, the passenger 510 is notified that the vehicle 504 may arrive at any of the parking locations 508A of the parking zone 506A.

In an embodiment, the occupancy forecasting system 550 continues to receive status information as the vehicle 504A is enroute to the destination location. In some examples, the received status information is provided or transmitted from other vehicles 504 (e.g., vehicle 504B-504H) driving and/or parked within the environment 500. Details of acquiring status information are described below with reference to FIG. 6. The occupancy forecasting system 550 uses the status information to probabilistically predict or forecast whether the destination location will be available and/or accessible when the vehicle 504A arrives at the destination location to pick up the passenger 510. For example, the status information is indicative of whether or not the particular parking location 508A and/or any of the parking locations 508 within a particular parking zone 506A is available, e.g., whether a vehicle 504 is currently parked in the parking location 508A. In some examples, the status information includes an availability of the parking location 508A, an accessibility of the parking location 508A, and/or a congestion level of the area near the parking location 508A (e.g., within a 10 foot or 50 foot radius of the parking location 508A). In some examples (but not explicitly shown), parking location 508A may no longer exist (e.g., from an out-of-date database or map). In this example, the status information is stored in the database and queried by some or all of the vehicles 504 within the occupancy forecasting system 550 to obtain a status of any of the parking locations 508 and/or predict a future status of any of the parking locations 508.

In an embodiment, the destination of the vehicle 504A is determined based on at least one event occurring within a radius of the parking locations 508. For example, the status information represents at least one event within a radius (e.g., 100 feet, 500 feet, etc.) of the parking locations 508. In some examples, the event is a sports game, a show, a concert, a protest, a marathon, and/or the like (e.g., as determined via a query to local news sources). For example, the vehicle 504A uses the information about the events to select a parking location 508 away from the event, e.g., unless the passenger indicates a preference to attend the event.

In an embodiment, the destination of the vehicle 504A is determined based on at least one of a temperature, precipitation, wind chill, and/or humidity at the parking locations 508. In this embodiment, the status information represents at least one of a temperature, a precipitation, a wind chill, and a humidity at the parking location 508A at a time when the vehicle 504A is expected to arrive at the parking location 508A. For example, in situations where inclement weather is likely at parking location 508A (e.g., as determined from a weather service database such as weather.com), a system on the vehicle (e.g., the computer processors 146 located within the vehicle 504A) uses this information to select a covered parking location 508 (not explicitly shown in FIG. 5).

In an embodiment, one or more of the vehicles 504 within the occupancy forecasting system 550 are configured to acquire status information (e.g., weather at a location, whether a vehicle is located at a location, and/or the like) about some or all of the parking locations 508 in each parking zone 506 in the environment 500. In some examples, the status information is acquired by LiDAR and/or camera systems of the vehicles 504 as they drive through the environment 500 and pass by parking locations 508. In some examples, the vehicles 504 acquire the status information as the vehicles 504 are driving through the environment 500 during normal travel (e.g., as the vehicles drive by a parking location 508 on the way from a first location to a second location). In some examples, the vehicles 504 are instructed by the occupancy forecasting system 550 to specifically drive to a particular parking location 508 and acquire images of the particular parking location 508. In other examples, the status information is acquired by LiDAR and/or camera systems of the vehicles 504 as the vehicles 504 are parked at the parking locations 508 (e.g., to acquire status information about the other parking locations 508 within the parking zone 506 where the vehicle 504 is parked.

In an embodiment, the occupancy forecasting system 550 determines the status information of the parking locations 508 based on the acquired LiDAR and/or camera information, predicts a future status of the particular parking location 508A based on the status information, and transmits the status information and/or future status information to the database of the server 520 for storage. In this context, "future status" represents a predicted status at a specific moment in time into the future, measured from when the status information was acquired by a vehicle 504. In some examples, the future status is predicted for a time in the future, e.g., at least 10 minutes after the status information was acquired or at the same time tomorrow from when the status information was acquired. In some examples, "future status" and/or "future time" represents a time from when the image information was acquired by a vehicle 504. For example, the future time represents a time 10 seconds into the future from when the image information was acquired by the vehicle 504. In some examples, future status is predicted (e.g., probabilistically predicted using a machine learning system) for several future times. For examples, in some scenarios, the future status represents a predicted status 10 seconds, 20 seconds, 30 seconds, 60 seconds, and 1 minute into the future. In some examples, some or all of these predicted future statuses are stored in the database of the server 520 for querying by vehicles 504 of the occupancy forecasting system 550. In an embodiment, the database stores the status information and/or future status information for querying by all vehicles 504 within the occupancy forecasting system 550 to determine whether a particular parking location 508 will be available and/or accessible at a future time.

In an embodiment, the status information represents a current status of the accessibility of each parking location 508 and the occupancy forecasting system 550 predicts a status or a future status of the respective parking location 508 based on the current status information of the respective parking location 508 or adjacent parking locations 508.

Figure 6:
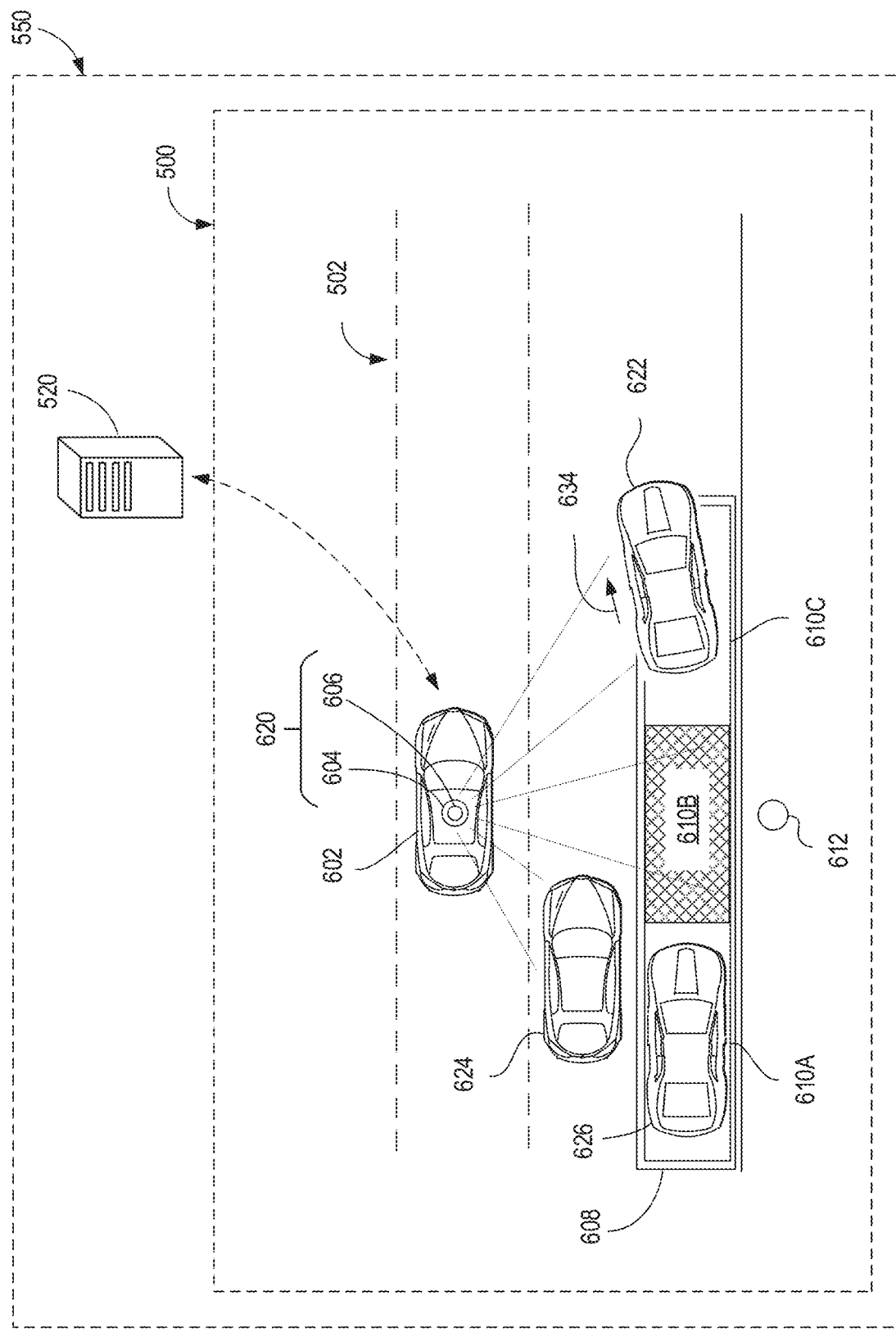
FIG. 6 shows a vehicle acquiring status information about a parking location within the environment of FIG. 5.

FIG. 6 shows a vehicle 602 acquiring status information about one or more parking locations 610A-610C (collectively "parking locations 610") within the environment 500. In an embodiment, the vehicle 602 is the same as, or similar to, the vehicle 504 and/or vehicle 100 described with reference to FIG. 5 and FIG. 1, respectively. In an embodiment, the vehicle 602 includes a LiDAR system 604. In an embodiment, the LiDAR system 604 of vehicle 602 is the same as, or similar to, the LiDAR system 123 of vehicle 100 described with reference to FIG. 1. In an embodiment, vehicle 602 includes a camera system 606. In an embodiment, the camera system 606 is the same as, or similar to, the camera system 122 of vehicle 100 described with reference to FIG. 1.

The LiDAR system 604 and/or camera system 606 includes one or more sensors 620 configured to acquire status information about one or more parking locations 610 within a parking zone 608 in the environment 500. In an embodiment, the sensors 620 include a thermal imaging camera to detect a thermal signature of vehicles (e.g., vehicles 622, 624, and 626 shown in FIG. 6) and pedestrians (not explicitly shown in FIG. 6). For example, the thermal imaging camera acquires a thermal image and determines that a thermal signature of the thermal image is above a threshold indicating a presence of a vehicle or a pedestrian. In an embodiment, the sensors 620 include a microphone to acquire sound information and detect a sound level or an audible signature of vehicles and pedestrians based on the sound information. For example, a microphone system determines that a sound level is above a threshold indicating a presence of a vehicle or a pedestrian.

As shown in the example of FIG. 6, the vehicle 602 acquires status information of the parking locations 610 from the sensors 620 of the vehicle 602. In some examples, acquiring the status information includes detecting one or more objects within a boundary of the parking location 610 (e.g., via imaging processing). In this context, the term "objects" are physical objects that prevent or impede access (e.g., block accessibility) to the parking location 610. The objects include, but are not limited to, vehicles, pedestrians, garbage bins, garbage, construction cones, temporary fencing, construction barriers, and packages.

The "boundary" of the parking locations 610 defines the permissible parking area for a vehicle. The boundary of the parking locations 610 are retrieved from the database. In some examples, the boundary is a 3D domain that accounts for a height above the surface of the road (e.g., 10 feet) for vehicle clearance. In some examples, the occupancy forecasting system 550 determines the destination location of a vehicle (e.g., vehicle 504A described with reference to FIG. 5) based on the permissible parking area defined by the boundary of the parking locations 610. For example, the occupancy forecasting system 550 determines that a vehicle (e.g., vehicle 504A) is 10 feet in length (e.g., by receiving vehicle size information from a vehicle registry) and subsequently selects the destination location to include parking locations 610 that are at least 10 feet in length to accommodate the vehicle length of 10 feet. In some examples, the occupancy forecasting system 550 applies the same reasoning to a width of the parking location 610 and/or the length of the parking location 610. In this example, the destination location is selected by the occupancy forecasting system 550 based on physical dimensions of the parking location and the physical dimensions of the vehicle (e.g., vehicle 504A).

In some examples, detecting the one or more objects is performed using image processing software of the occupancy forecasting system 550 (e.g., image recognition or image classification is used to determine an identification of the object as a vehicle or a pedestrian). For example, image processing is used to identify a parking meter 612 associated with the parking locations 610 and a location of the parking meter 612 is used to confirm the location of the parking location. In this example, the status information includes information about the parking meter associated with the parking location.

In the scenario shown in FIG. 6, the vehicle 602 acquires status information of the three parking locations 610 as the vehicle 602 drives by the parking location 610. The sensors 620 of the vehicle 602 acquire status information (e.g., image information and/or audible information) of at least some of the parking locations 610 of a parking zone 608 and the information is processed by the occupancy forecasting system 550 (e.g., using the imaging processing software and/or an acoustic processing software) to determine the status information of some or all of the parking locations 610 within a parking zone 608.

As described above with reference to FIG. 5, in some examples, the vehicle 602 continuously acquires status information of each parking location 610 as the vehicle 602 drives by each parking location 610 during the vehicle's travels within the environment 500. In other scenarios, the vehicle 602 is instructed by occupancy forecasting system 550 to acquire status information of a particular parking zone 608 and/or particular parking location 610 within a particular parking zone 608.

In an embodiment, the image processing is performed by the occupancy forecasting system 550 (e.g., a server 520 associated with the occupancy forecasting system 550). In some examples, the occupancy forecasting system 550 transmits a request to the vehicle 602 to acquire status information about the parking locations 610. In turn, the occupancy forecasting system 550 receives the images, audio, and/or video acquired by the vehicle 602 and/or the status information about the parking locations 610 directly. In examples where images, audio, and/or video are received, the occupancy forecasting system 550 includes image processing capabilities to detect the one or more objects within the images and determine the status information about the parking locations 610.

In an embodiment, the occupancy forecasting system 550 generates a status history of the parking locations 610 and stores the status history in the database. In some examples, the status history is a chronological list of historical statuses of the parking locations 610. In some examples, the status history includes date and time information when the status was acquired and determined. In this example, the status history represents status information and previous status information and is a record of historical status information about the parking locations 610. In some examples, the database receives requests from vehicles within the occupancy forecasting system 550 for a status of a particular parking zone 608 and/or a particular parking location 610.

In an embodiment, the occupancy forecasting system 550 predicts (e.g., probabilistically predicts using a machine learning system) the future status of the parking location 610 based on the status history of the parking location. In some examples, the status history includes information that on a particular day of the year (e.g., July 4$^{th}$) the parking locations 610 are occupied 98% of the time between 9 AM and 9 PM. In this scenario, the occupancy forecasting system 550 predicts that availability of the parking locations 610 on this particular day next year will be low (e.g., not likely to be available). In other examples, the status history includes information that at 5 PM on weekdays during a particular month, the parking locations 610 are occupied 98% of the time. In this scenario, the occupancy forecasting system 550 predicts that availability of the parking locations 610 on this particular time during the week of this particular month will also be low (e.g., not likely to be available).

In some examples, the status history includes information that on a particular day of the year (e.g., February 1$^{st}$) the parking locations 610 are occupied 2% of the time between 9 AM and 9 PM. In this scenario, the occupancy forecasting system 550 predicts that availability of the parking locations 610 on this particular day next year will be high (e.g., likely to be available). In other examples, the status history includes information that at L0AM on weekdays during a particular month, the parking locations 610 are occupied 5% of the time. In this scenario, the occupancy forecasting system 550 predicts that availability of the parking locations 610 on this particular time during the week of this particular month will also be high (e.g., likely to be available).

In some examples, the occupancy forecasting system 550 predicts the future status based on a status history of an adjacent parking location. For example, if one parking location is a construction zone (e.g., as determined via processing images and classifying construction cones or equipment or as determined via receiving information from the server 520), the occupancy forecasting system 550 predicts that the adjacent parking location is also in a construction zone.

In an embodiment, the occupancy forecasting system 550 predicts a future status of the parking locations 610 based on a predicted movement of the detected objects. For example, consider the following scenario. Vehicle 602 drives by parking location 610 and acquires image information about an object. The occupancy forecasting system 550 processes the image information (e.g., via image processing) and determine that the object is a vehicle. The vehicle 602 continuously acquires image information about the vehicle 622 (e.g., two or more images per second) and continuously processes the image information to determine a movement of the vehicle 622. In the example shown in FIG. 6, the vehicle 622 movement is shown by an arrow 634 and the vehicle 622 is presumably leaving the parking location 610C because of proximity to parking location 610C, the movement of the vehicle 622, and/or a use of turn signals. In an embodiment, the movement of the vehicle 622 is indicated in the status information.

In an embodiment, the occupancy forecasting system 550 predicts whether the vehicle 622 will be blocking the accessibility to the parking location 610 at a future time based on the movement of the vehicle 622 and/or based on the direction of travel of the vehicle, speed of the vehicle, turn signals of the vehicle, etc. Similarly, in some examples, the occupancy forecasting system 550 determines that a movement of a vehicle indicates that the vehicle is pulling into a parking location 610 (e.g., based on the direction of travel of the vehicle, speed of the vehicle, turn signals of the vehicle, etc.) to presumably park in the parking location.

The status of the parking location at the future time represents the predicted future status. For example, the predicted future status is based on the movement of the detected objects and a predicted movement is determined based on the determined movement represented in the acquired images from the vehicle.

In some examples, the status information includes information about the accessibility of the parking locations 610 and the objects blocking the accessibility of the parking locations 610 so that the database includes information about the object. For example, in the case where the detected object is a pedestrian (e.g., detected via the imaging processing software), the status indication stored in the database indicates that the object is a pedestrian. In another example where the detected object is a vehicle (e.g., a vehicle 622 as detected via the imaging processing software), the status indication stored in the database indicates that the object is a vehicle.

In an example, the field of view of the sensors 620 is partially obstructed by a vehicle 624 driving in a lane adjacent to the vehicle 602 in the environment 500. The presence of vehicle 624 affects the ability of the vehicle 602 to assess the status information of parking location 610A with accuracy because some information about the parking location 610A is unavailable due to the obstructed vehicle 624. In some examples, the obstruction is determined by the occupancy forecasting system 550 when the occupancy forecasting system 550 determines that a location of the obstructed object is outside the boundary of the parking location (e.g., using 3D position information from the sensors 620). In some examples, an indication that the parking location 610A is obstructed is indicated within the status information.

In an embodiment, the occupancy forecasting system 550 determines an accuracy representing an accuracy level of the status information. For example, the occupancy forecasting system 550 determines the accuracy is a low accuracy or a high accuracy. In some examples, the occupancy forecasting system 550 determines a low accuracy when the occupancy forecasting system 550 cannot classify the object or is having difficulty classifying the object (e.g., if the occupancy forecasting system 550 cannot determine if the object is a vehicle or a pedestrian using imaging processing). In another example, the occupancy forecasting system 550 associates the status information with a low accuracy when the occupancy forecasting system 550 determines that a location of the detected object is outside the boundary of parking location (e.g., if an object is obstructing the view of the parking location from the perspective of the vehicle). In another example, the occupancy forecasting system 550 associates the status information with a low accuracy when the accuracy determined via an image classification system is below a threshold (e.g., 20%). In other examples, the occupancy forecasting system 550 determines a high accuracy when the occupancy forecasting system 550 determines that the object is a vehicle or a pedestrian using imaging processing above a threshold accuracy, or when a location of the detected object is inside the boundary of parking location. In some examples, the accuracy is included in the status information and stored in the database.

In an embodiment, the occupancy forecasting system 550 transmits a request for an additional vehicle to verify (or confirm) the status information of a parking location 610 based on the first vehicle determining a status of the parking location 610 with low accuracy. In some examples, the request is based on an accuracy (e.g., a low accuracy from an obstructed view or a low accuracy from a failed classification of the detected object) of the status information determined from a previous vehicle driving by the parking location 610.

Figure 7:
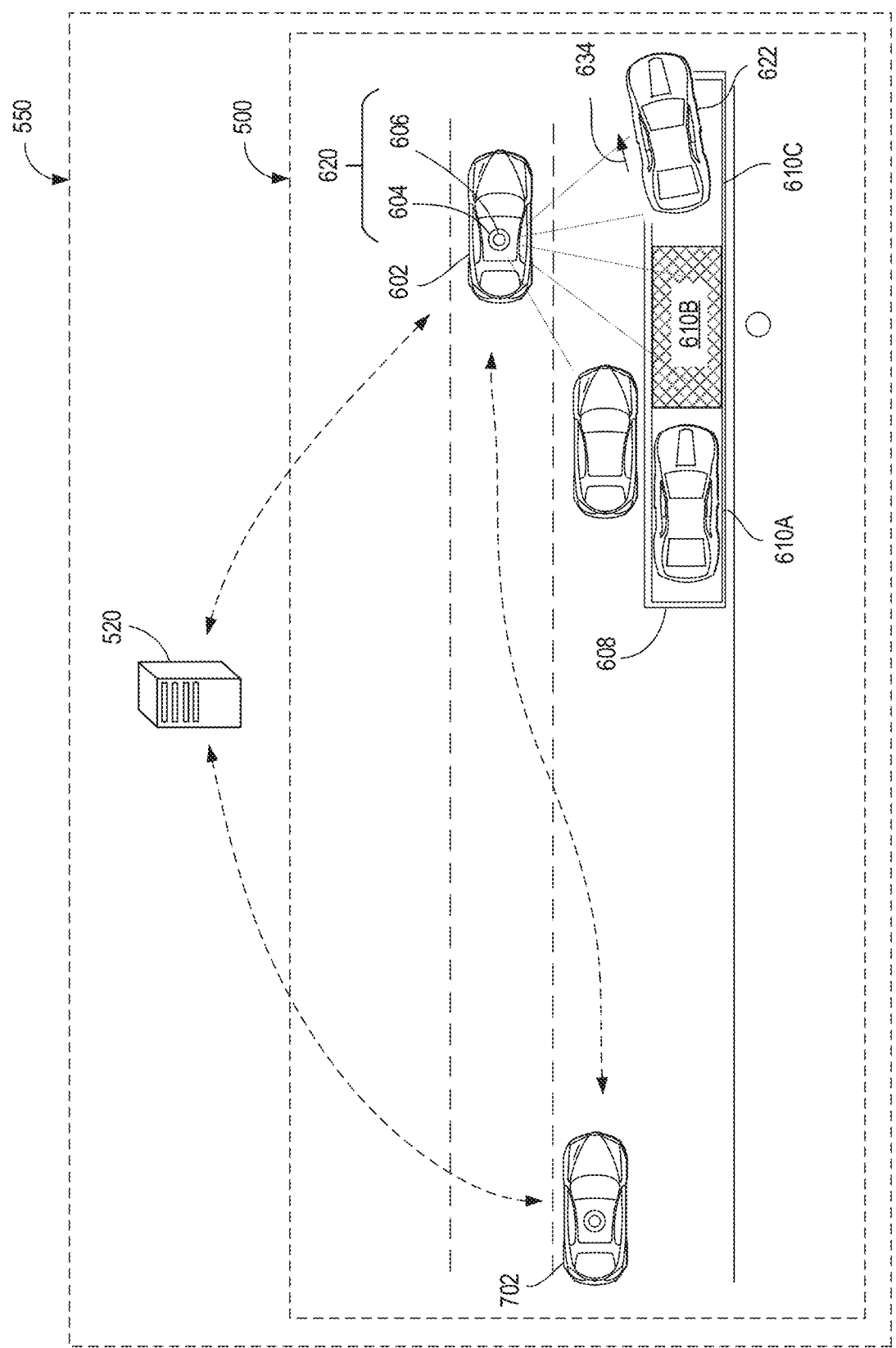
FIG. 7 shows a vehicle driving to the parking location within the environment of FIG. 6.

FIG. 7 shows a vehicle 702 driving to the parking location 610 within the environment 500. The vehicle 702 is included in the occupancy forecasting system 550 and, in an embodiment, is the same as, or similar to, the vehicle 504A described with reference to FIG. 5. In some examples, the vehicle 702 is driving to pick-up the passenger 510 as shown in FIG. 5. In other examples, the vehicle 702 is carrying the passenger 510 and is driving to a destination to drop-off the passenger 510 and/or pick up additional passengers.

In an embodiment, the occupancy forecasting system 550 predicts that the vehicle 702 will arrive at the destination (e.g., parking location 610 as previously determined by the occupancy forecasting system 550 and/or selected/confirmed by the passenger 510) in a period of time (e.g., two minutes). In some examples, the occupancy forecasting system 550 predicts that the vehicle 702 will arrive at the destination in two minutes based on traffic congestion, speed limits, weather, and/or road availability between the current location of the vehicle 702 and the parking location 610. In some examples, traffic congestion, speed limits, weather, and/or road availability information is received by the server 520 as stored in the database.

In an embodiment, the occupancy forecasting system 550 queries the database to retrieve the most recent status of the parking zone 608 and/or parking location 610. In some examples, the occupancy forecasting system 550 predicts the future status of the parking location 610 at a time when the vehicle 702 is predicted to arrive at the parking zone 608 in general and/or the parking locations 610.

In an embodiment, the occupancy forecasting system 550 queries the database for the status information of all parking zones 608 and parking locations 610 within the environment 500 and/or predicts future status information of all parking zones 608 and parking locations 610 within the environment 500 when the destination is determined (e.g., before the vehicle 702 picks up the passenger). In this scenario, the status information is stored in the database as the status information is received from each vehicle within the occupancy forecasting system 550. In this way, each vehicle within the occupancy forecasting system 550 can independently acquire status information about parking zones 608 and/or parking locations 610 within the environment 500 and all the status information provided or transmitted to the database for storage and querying by any or all of the vehicles within the occupancy forecasting system 550. Similarly, in some cases, the occupancy forecasting system 550 predicts a future status of each parking location 610 within the environment 500 for a range of future times (e.g., in one minute intervals) and stores the future status information in the database for querying by any or all of the vehicles within the occupancy forecasting system 550.

In an embodiment, the occupancy forecasting system 550 determines the destination of the vehicle 702 based on the predicted future status of the parking zone 608 and/or parking location 610. In some examples, the occupancy forecasting system 550 determines the destination of the vehicle based on a time when the status information was acquired. As one example, the status information is acquired ten minutes before a vehicle is predicted to arrive at the parking location. In some embodiments, the status information is used in determining a likelihood that the location will be available when the vehicle arrives. In some examples, the occupancy forecasting system 550 compares the time with rush hour times in the area of the location (e.g., via a database look-up).

For example, 5 PM Eastern Time in Boston, Mass. is indicative of rush hour and a prediction is made based in part that the parking location is not likely to be available (e.g., low probability of availability) at 5 PM in Boston and/or that access to the location will be blocked by the predicted traffic (e.g., low probability of accessibility). In an embodiment, a low probability of availability is determined when the forecasted future availability is less than a threshold (e.g., 40%, 50%, 60% probability, etc.). Similarly, in an embodiment, a low probability of accessibility is determined when the forecasted future accessibility is less than a threshold (e.g., 40%, 50%, 60% probability, etc.).

In other examples, LOAM Eastern Time in Boston, Mass. is indicative of non-rush hour and a prediction is made based in part that the parking location is likely to be available (e.g., high probability of availability) at LOAM in Boston and/or that access to the location will not be blocked by any predicted traffic (e.g., high probability of accessibility). In an embodiment, a high probability of availability is determined when the predicted future availability is greater than a threshold (e.g., 60%, 50%, 40% probability, etc.). In some cases, the threshold used to delineate between a low probability of availability and a high probability of availability is the same. Similarly, in an embodiment, a high probability of accessibility is determined when the forecasted future accessibility is greater than a threshold (e.g., 60%, 50%, 40% probability, etc.). In some cases, the threshold used to delineate between a low probability of accessibility and a high probability of accessibility is the same.

In an embodiment, a third criteria is used between a low probability of availability and/or accessibility and a high probability of availability and/or accessibility, such that the occupancy forecasting system 550 predicts that a parking location will be "possibly" available. In this scenario, a possible probability of accessibility and/or availability is determined when the forecasted future accessibility and/or availability is greater than the threshold uses to classify a low probability of accessibility and/or availability and less than the threshold uses to classify a high probability of accessibility and/or availability.

In another example, the occupancy forecasting system 550 compares the time with anticipated night time events (e.g., nightlife) in the area of the location. For example, 10 PM Eastern Time in Miami, Fla. is indicative of nightlife and a prediction is made based in part that that the location is not likely to be available (e.g., low probability of availability) at 10 PM in Miami. As another example, the destination of the vehicle is determined based on whether the time is indicative of daytime or nighttime based on sunrise or sunset times at the parking location.

In an embodiment, the occupancy forecasting system 550 determines the destination of the vehicle based on a day when the status information was acquired. As an example, the status information is acquired on a weekend when less traffic is present and therefore it is more likely that the parking location will be available (e.g., high probability of availability). As another example, the status information is acquired on a weekday when more traffic is present and therefore it is less likely that the parking location is available (e.g., low probability of availability). For example, the occupancy forecasting system 550 determines if the day is Monday-Friday and predicts that it is not likely that the parking location will be available and/or accessible (e.g., low probability of availability and/or accessibility) because traffic is expected. As another example, the occupancy forecasting system 550 determines if the day is a national or local holiday and predicts that it is likely that the location will be available (e.g., high probability of availability and/or accessibility) because no traffic is expected.

In an embodiment, the occupancy forecasting system 550 determines whether to change the destination of the vehicle 702 based on the future status representing a time when the vehicle 702 is predicted to arrive at the destination and/or additional status information. In some examples, the additional status information represents recent status information of the parking location 610 (e.g., status information acquired after the destination was initially determined). In some examples, the additional status information is used to update the future status of the parking location and, in scenarios where the updated future status indicates that a likelihood that the parking location will be available has decreased below a pre-determined threshold (e.g., below a likelihood of 20%), the occupancy forecasting system 550 determines to change the destination to a new parking location with a higher likelihood than the current destination. In an embodiment, the occupancy forecasting system 550 determines the new destination based on walking distance from the original destination, handicap accessibly, whether the new destination includes a shelter covering the parking locations (e.g., parking garage), and/or based on the predicted future status of the new destination.

For example, if the destination is the parking zone 608 and all three parking locations 610A-610C are predicted to be inaccessible or occupied when the vehicle 702 is predicted to arrive at the parking zone 608 (e.g., via a low probability of availability and/or accessibility), the occupancy forecasting system 550 changes the destination from the parking zone 608 to a different parking zone (e.g., a plurality of parking zones are shown in FIG. 5) but also within walking distance from the parking zone 608. As another example, if the destination is the parking location 610A specifically (e.g., as indicated via a passenger preference) and parking locations 610A is predicted to be inaccessible or occupied when the vehicle 702 is predicted to arrive at the parking location 610A (e.g., via a low probability of availability and/or accessibility), the occupancy forecasting system 550 changes the destination from the parking location 610A to a different parking location (e.g., parking locations 610B or 610C) within the same parking zone 608.

In an embodiment, the occupancy forecasting system 550 changes the destination of the vehicle based on the accuracy associated with the status information. For example, when the occupancy forecasting system 550 receives status information associated with a low accuracy (e.g., indicating the availability and/or accessibility parking location could not be determined accurately), the occupancy forecasting system 550 changes the destination to a new parking location associated with status information with a higher accuracy than the current destination. In this example, if the current destination is associated with a parking location with low accuracy (e.g., 20%) but the adjacent parking location is available with a higher accuracy (e.g. 40%) than the current destination, and the adjacent parking location is available and accessible, then the occupancy forecasting system 550 can change the destination to the adjacent parking location.

In an embodiment, the occupancy forecasting system 550 requests authorization (or permission) from a passenger (e.g., a passenger waiting to be pick-up or a passenger already within the vehicle 702) to change the destination of the vehicle 702 based on a change of status information of the parking locations 610. For example, the passenger is notified (e.g., via a user interface of the mobile device and/or a user interface within the vehicle 702) that the occupancy forecasting system 550 recommends changing the destination (or, from the passenger's perspective, the drop off location or pick-up location) based on a change of the status information (e.g., a particular parking location 610 is no longer available and/or no longer accessible).

In an embodiment, the passenger can approve or deny the recommendation to change the destination (e.g., using the user interface of the mobile device and/or a user interface of the vehicle 702). For example, the occupancy forecasting system 550 can provide or transmit a request to the mobile device associated with the passenger for presenting an inquiry on the user interface requesting the authorization. In this example, the passenger makes a selection on the user interface and the occupancy forecasting system 550 receives an indication representing whether the passenger approved or denied the request. In other examples, the occupancy forecasting system 550 transmits a request to a user interface within the vehicle 702 for presenting an inquiry requesting the authorization. In turn, the occupancy forecasting system 550 receives an indication representing whether the passenger approved or denied the request.

In an embodiment, the occupancy forecasting system 550 changes the destination of the vehicle based on the requested authorization (e.g., based on the approval or the denial from the passenger). For example, the occupancy forecasting system 550 instructs the vehicle 702 to proceed to a new destination (e.g., a new parking location) instead of the original destination (e.g., the original parking zone) when the requested change is approved by the passenger. In other scenarios, the occupancy forecasting system 550 instructs the vehicle 702 to proceed to the original destination (e.g., the original parking location) when the requested change is denied by the passenger. In some cases, the occupancy forecasting system 550 instructs the mobile device and/or user interface of the vehicle 702 to present an alert to the passenger that increased traffic congestion and/or increased wait times may occur if the original destination is maintained. In some cases, a tolerance for wait times (e.g., waiting in line for the parking location) and/or traffic congestion is increased by the occupancy forecasting system 550 if the passenger maintains the original destination.

In an embodiment, responsive to receiving a declined request, the occupancy forecasting system 550 receives additional status information and determines that is not possible to arrive at the original destination (e.g., within a predetermined time limit such as an hour or a day). For example, upon receiving the declined request, the occupancy forecasting system 550 receives additional information (e.g., via an accident database) that an accident has occurred within a radius threshold of the destination (e.g., within 500 feet of the destination) and that the parking location is now temporarily inaccessible for 2 hours while the accident is cleared. In this example, the occupancy forecasting system 550 overrides the denial based on the additional status information of the parking locations and notifies the passenger that the road of the original destination is now closed because of an accident and that a new destination is being selected by the occupancy forecasting system 550 (e.g., the declined decision is overridden).

In an embodiment, responsive to receiving a declined request, the occupancy forecasting system 550 receives additional status information and determines that the predicted future status of the destination has decreased below a pre-determined threshold (e.g., below an accessibility probability of 20%). For example, the occupancy forecasting system 550 overrides the declined request to change destinations and instructs the vehicle to proceed to a new destination despite receiving the despite request (e.g., the declined decision is overridden). In some cases, the pre-determined threshold is a user preference.

In an embodiment, responsive to receiving a declined request, the occupancy forecasting system 550 receives additional status information and determines that is unsafe to proceed to the original destination. For example, upon receiving the declined request, the occupancy forecasting system 550 receives additional information (e.g., via an emergency alert service or a police database) that a disturbance (e.g., a crowd, an unanticipated gathering of individuals, and/or the like) is either occurring or is planned for when the vehicle 702 is predicted to arrive at the destination. In this example, the occupancy forecasting system 550 changes the destination to the new destination outside the affected area of the disturbance despite receiving a declined request (e.g., the declined decision is overridden).

In an embodiment, an affected area (e.g., affected streets, towns, neighborhoods, etc.) of the disturbance is stored in the database and the decision to override the declined request of changing destinations is based on the affected area of the disturbance.

In an embodiment, a crowded determination is made by the occupancy forecasting system 550 when a density of vehicles and/or pedestrians within a radius of the destination is above a threshold. For example, the occupancy forecasting system 550 determines the crowed determination when more than 10 people are predicted to be within a 10 foot radius of the parking location at the future time when the vehicle is predicted to arrive at the destination.

In some examples, the additional information indicates a power outage has occurred at the destination (e.g., from an electric service provider) and a map of the power outage is received indicating an affected area. In this example, the occupancy forecasting system 550 determines a new destination outside of an affected area of the power outage (e.g., as defined by the emergency alert service or the electric service provider) and the occupancy forecasting system 550 changes the destination to the new destination despite receiving a declined request (e.g., the declined decision is overridden).

In an embodiment, the passenger is provided with a second recommendation after the occupancy forecasting system 550 received updated status information about the destination and/or before the occupancy forecasting system 550 overrides the request that the destination to be changed. In turn, the passenger's response is received by the occupancy forecasting system 550. In some examples, the destination is changed in response to the passenger's response to the recommendation.

In an embodiment, the vehicle 702 includes a controller for controlling the vehicle 702 to drive to the destination based on the predicted future status of the parking location. Similarly, other vehicles within the occupancy forecasting system 550 include a controller for controlling each respective vehicle.

In an embodiment, the occupancy forecasting system 550 instructs a second vehicle to drive to the destination of the vehicle 702 and park at the destination. For example, the second vehicle is instructed to remain at the destination (e.g., to occupy the destination so other vehicles do not park in the parking location) until the vehicle 702 arrives at the destination. In this example, the second vehicle holds the parking location for the vehicle 702. In this example, the second vehicle is controlled to drive to the destination.

In an embodiment, the occupancy forecasting system 550 determines to instruct the second vehicle to hold a parking location for another vehicle based on the predicted future status and/or a passenger preference. For example, the occupancy forecasting system 550 determines that the parking location will be unavailable when the vehicle 702 is predicted to arrive at the destination (e.g., based on updated status information). In this example, the occupancy forecasting system 550 determines that the vehicle 702 is schedule to arrive at the destination in 1 minute. However, the occupancy forecasting system 550 also knows that a second vehicle is about to pass by the destination. In this example, the occupancy forecasting system 550 knows that the second vehicle is about to pass by the destination because the occupancy forecasting system 550 maintains a database of all locations and all routes of each vehicle within the environment 500. In this example, the occupancy forecasting system 550 queries the database to determine that the second vehicle will pass by the destination within 1 minute (e.g., before the first vehicle is scheduled to arrive at the destination). In this example, the occupancy forecasting system 550 instructs the second vehicle to occupy the parking location of the destination until the vehicle 702 arrives.

In this way, occupancy forecasting system 550 can determine whether to hold a parking location for another vehicle based on proximity of other vehicles within the environment to the destination, routes of each vehicle within the occupancy forecasting system 550, a historical demand for the parking location, and passenger preferences of the passengers of each vehicle. For example, if a high demand parking location has become available, the occupancy forecasting system 550 instructs a second vehicle to occupy the parking location for a first vehicle.

Figure 8:
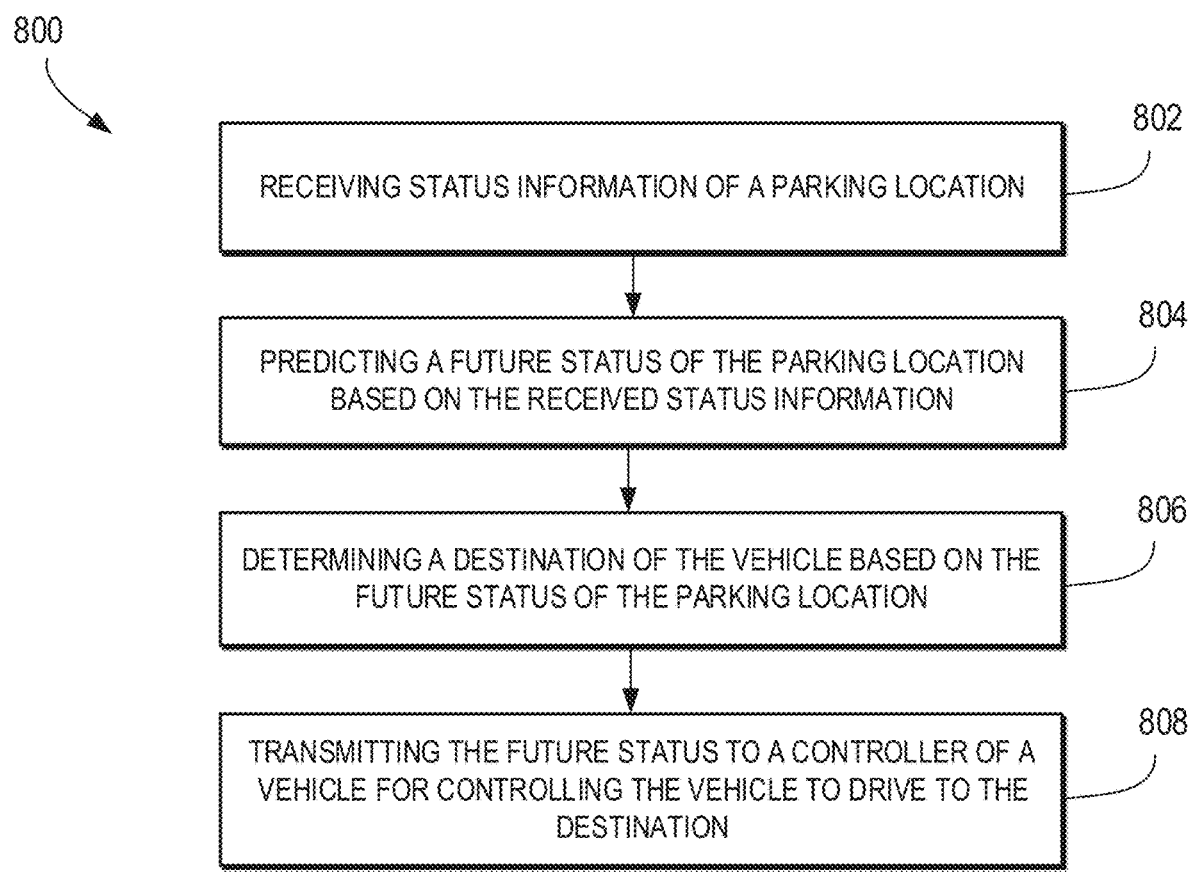
FIG. 8 shows a flowchart for forecasting occupancy of a parking location.

FIG. 8 shows a flowchart representing a process 800 for forecasting occupancy of a parking location. For example, the process 800 could be carried out by one or more computer processors 146 of the vehicle 100 described with reference in FIG. 1, the server 520 described with reference in FIG. 5, the mobile device 512 described with reference to FIG. 5, or generally the occupancy forecasting system 550 described with reference to FIGS. 5-7.

In some embodiments, status information of a parking location is received (block 802). For example, status information is received from the server 520 and/or another vehicle.

In an embodiment, the status information is acquired from at least one camera of a vehicle (e.g., a vehicle that is the same as or similar to vehicle 100). For example, the status information is acquired and transmitted to the server and/or other vehicles. In some examples, the status information is acquired from at least one LiDAR system of the vehicle. In some examples, the status information includes information about objects (e.g., pedestrians or vehicles) blocking the accessibility of the parking location. In some examples, the status information includes information about a parking meter associated with the parking location.

In some embodiments, a future status of the parking location is predicted (block 804). For example, the future status of the parking location can be predicted based on the received status information. For example, a destination is determined 806 based on the predicted future status of the parking location. In some examples, the destination is the parking location, and in other examples, the vehicle chooses another parking location.

In an embodiment, the predicted future status is provided (block 808) to a controller of a vehicle for controlling the vehicle to drive to the destination. For example, the vehicle receives instructions to continue to the determined destination. In some examples, a determination is made whether to change the destination of the vehicle.

In an embodiment, some or all of the computational processes of the occupancy forecasting system 550 are performed by the server 520. For example, a first vehicle acquires status information of the parking location (e.g., when driving by the parking location) and transmits the status information to the server 520. In this example, the server 520 predicts the future status of the parking location and determines whether to update the destination (e.g., of the first vehicle or a second vehicle) based on the predicted future status of the parking location. In this example, the server 520 then transmits the future status information and/or a request to change the destination to the first vehicle or the second vehicle. In this way, one vehicle can provide status information usable by another vehicle within the occupancy forecasting system 550 and instructions for controlling the second vehicle is provided to the second vehicle by the server 520.

In an embodiment, some or all of the computational processes of the occupancy forecasting system 550 are performed at the vehicle level. For example, a first vehicle acquires status information of the parking location (e.g., when driving by the parking location) and transmits the status information to a second vehicle directly. In this example, the second vehicle predicts the future status of the parking location and determines whether to update the destination based on the predicted future status of the parking location. In this example, the second vehicle then controls itself based on the predicted future status of the parking location.

Figure 9A:
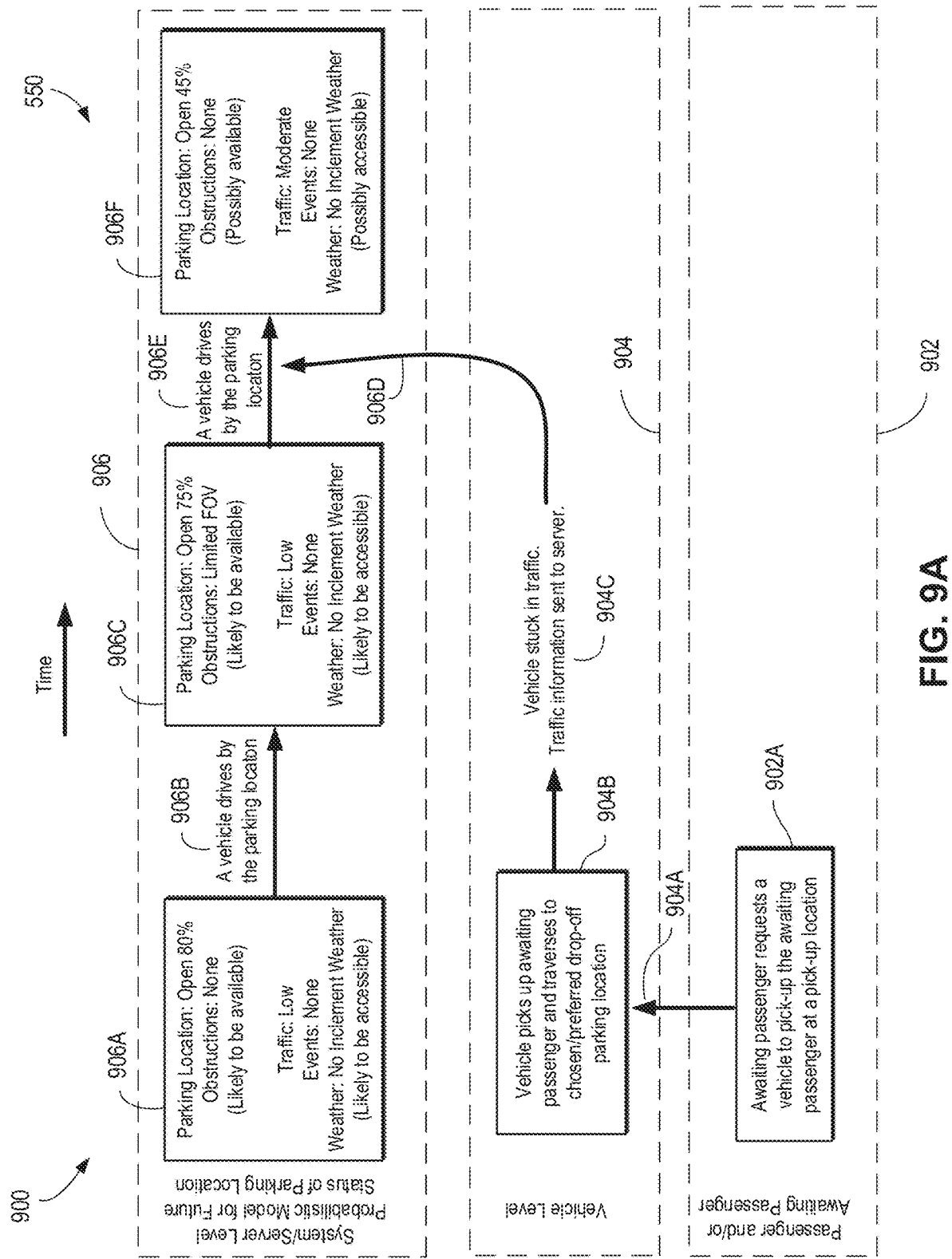
FIGS. 9A and 9B show an alternate flowchart for forecasting occupancy of a parking location.
Figure 9B:
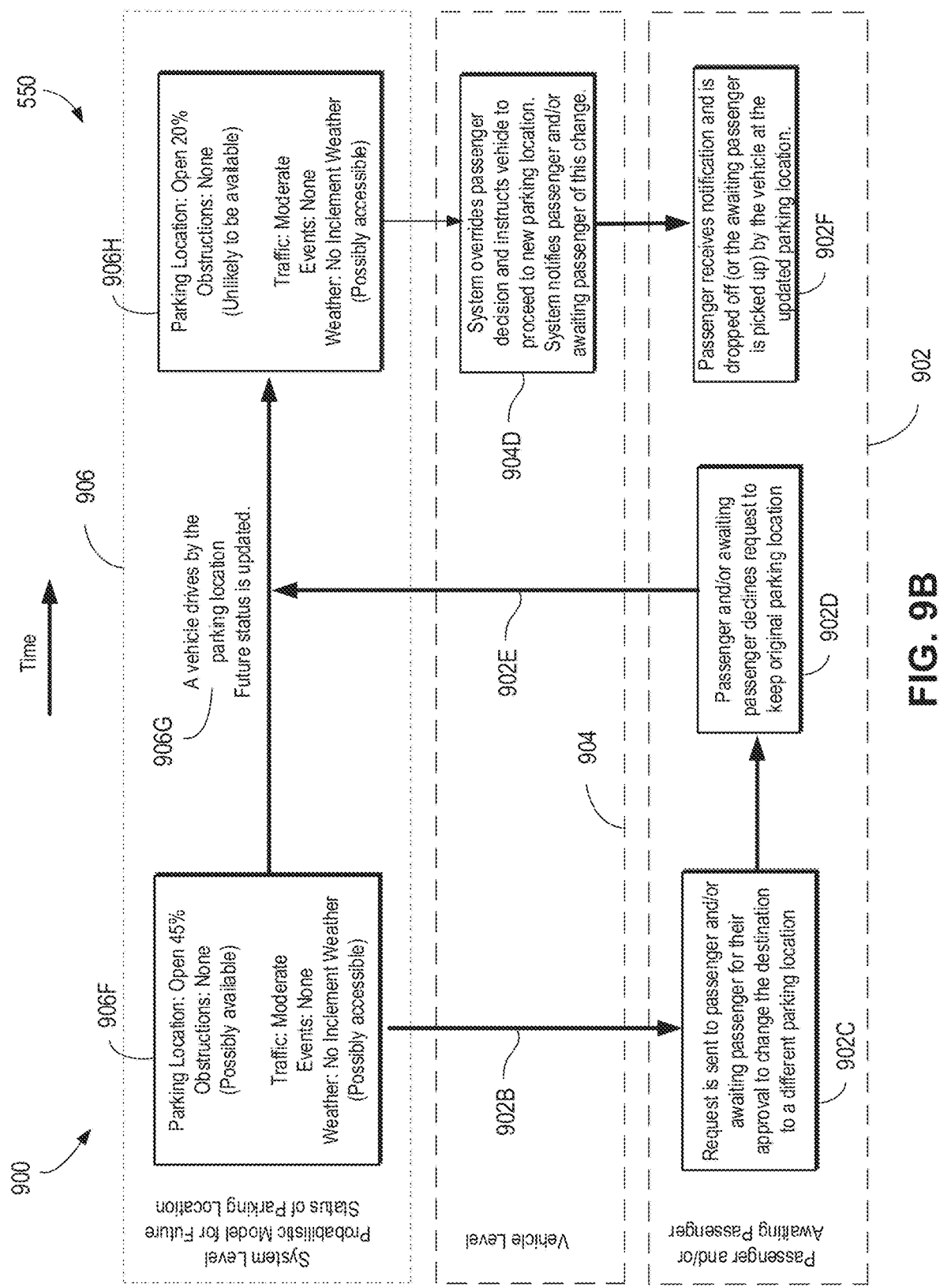

FIGS. 9A and 9B show an alternate flowchart representing a process 900 for forecasting occupancy of a parking location. The process 900 illustrates processes performed at the passenger level 902, the vehicle level 904, and the server level 906. As described above with reference to FIG. 5, the processes performed at the server level 906 are typically implemented by the server 520, but in some cases are performed by the vehicle itself or other vehicles within the network of vehicles of the occupancy forecasting system 550. Accordingly, the process 900 could be carried out by one or more computer processors 146 of the vehicle 100 described with reference in FIG. 1, the server 520 described with reference in FIG. 5, the mobile device 512 described with reference to FIG. 5, or generally the occupancy forecasting system 550 described with reference to FIGS. 5-7. In this way, the process 900 represents an example implementation of the computational steps performed by the occupancy forecasting system 550, but other implementations are used in other examples.

Referring to FIG. 9A, the passenger requests 902A a vehicle (e.g., vehicle 504A) to pick-up the passenger (e.g., passenger 510) at a pick-up location (e.g., via an app on a mobile device of the passenger such as the mobile device 512). The vehicle receives 904A the passenger's request via a server (e.g., the server 520) that is in communication with some or all vehicles within the occupancy forecasting system 550. A passenger can select a drop-off location (e.g., the destination) via the app.

After receiving 904A the passenger's request, the vehicle then drives (e.g., autonomously or semi-autonomously) to the pick-up location and picks up 904B (e.g., allows) the passenger to enter the vehicle. In some examples, the vehicle stops at the parking location for an amount of time (e.g., ten minutes, twenty minutes, and/or the like) until the passenger enters the vehicle (e.g., the passenger indicates to the vehicle that the passenger has entered the vehicle via the app on the mobile device). In some examples, the vehicle detects a presence of the passenger within the vehicle via one or more passenger detection sensors within the vehicle. The vehicle then drives to the selected and/or preferred destination (e.g., the drop-off location from the passenger's perspective). As previously described with reference to FIG. 1, in some examples, the vehicle is an autonomous vehicle and the vehicle at least partially controls itself to drive to the destination location with little or no human driver assistance. In other examples, the vehicle requires a driver to drive the vehicle to the destination.

When the destination is selected, the server 906 predicts 906A that the parking location is likely to be available (e.g., the parking location is predicted to be open with an 80% probability by the probabilistic forecasting model) and likely to be accessibility (e.g., the parking location is predicted to have low traffic, no events, and no implement weather with an 80% probability by the probabilistic forecasting model) when the vehicle is predicted to reach the destination. In this way, the server 906 predicts 906A that the parking location is likely to be both available and accessible when the vehicle is predicted to reach the destination.

Subsequently, a second vehicle drives 906B by the destination and acquires new/additional status information of the parking location of the destination. The second vehicle transmits the additional status information to the server 906 where the server 906 updates the future status prediction based on the additional status information from the second vehicle. Consequently, the server 906 now predicts 906C that the destination is predicted to be open with a 75% certainty (e.g., by the probabilistic forecasting model) when the vehicle is predicted to reach the destination. In the example depicted, when the second vehicle acquired the status information, a limited field of view was noted (e.g., perhaps because an object was obstructing a portion of the field of view). In this way, a determination of availability can be based on information about a field of view of the vehicle acquiring status information about the parking location.

The server 906 predicts 906C that the parking location is still likely to be accessible based on a prediction that traffic congestions are predicted to be low, no events are scheduled to occur/take place within a radius of the parking location, and no inclement weather is predicted. In this way, the server 906 predicts 906C that the parking location is likely to be available and accessible when the vehicle is predicted to reach the destination, but the probability that the parking location will be available has decreased relative to the initial prediction 906A.

In an example scenario, the vehicle with the passenger gets stuck in traffic 904B or in general traffic congestion is present while driving to the destination location which causes the vehicle to slow down below a predetermined speed threshold. In some examples, the vehicle determines that the vehicle is "stuck in traffic" when the speed of the vehicle decreases below a predetermined speed below the speed limit of the road the vehicle is currently driving. In some examples, the database maintains a listing of speed limits and the vehicle receives the speed limit information. For example, the vehicle determines traffic congestion is present when the speed of the vehicle decreases below 10 MPH below the speed limit (e.g., 25 MPH, if the speed limit for a particular road is 35 MPH). Then, in this case, when the vehicle determines that the vehicle speed is 24 MPH (e.g., via GPS of the vehicle or speed sensors of the vehicle), the vehicle determines that at least some traffic congestion is present and transmits 904C traffic information along with an indication that the vehicle is in traffic to the server 520. In this way, determining that traffic congestion is present (or being "stuck in traffic") is determined by the vehicle based on the vehicle speed and the speed limit information of the road the vehicle is currently traversing.

For example, the traffic congestion is determined based on a presence of other vehicles surrounding (or within a radius of) the vehicle and a vehicle speed of the vehicle. In this example, if the vehicle determines (e.g., via the LiDAR sensors or cameras of the vehicle or of adjacent vehicles) that another vehicle is to the left of the vehicle, another vehicle is to the right of the vehicle, another vehicle is in front of the vehicle, and/or another vehicle is behind the vehicle, and the vehicle speed is below a threshold speed, then the vehicle determines that traffic congestion is present. In some examples, the traffic congestion is determined based on a density of vehicles surrounding the vehicle (e.g., 10 vehicles within a 20 foot radius is indicative of traffic congestion).

The server 906 receives the transmitted information 906D about the traffic congestion information from the vehicle and searches for an alternate route the vehicle can take to reach the destination. For example, the server 906 compares traffic information of other roads in the environment 500. In some examples, the traffic congestion information is known by the server 906 because the traffic congestion information is stored in the database, retrieved from a mapping server, or retrieved from the vehicles that are driving within the environment 500. In an embodiment, the server 906 instructs the vehicle to change the route based on the status information. For example, the vehicle is controlled to change the route from an original route to a new route and is controlled to follow the new route.

While the vehicle is stuck in traffic, a third vehicle (or the second vehicle) drives 906E by the destination and acquires status information of the parking location. The third vehicle transmits the status information to the server 906 where the server updates the future status prediction based on the updated status information from the third vehicle. Consequently, the server 906 now predicts 906F that the parking location is predicted to be "possibly" available (e.g., open with a 45% probability as determined by the probabilistic forecasting model) when the vehicle is predicted to reach the destination. When the third vehicle acquired the status information, no obstructions were noted (e.g., perhaps because a complete field of view of the parking location was visible from the perspective of the third vehicle). The server 906 now predicts 906F that the parking location is "possibly" accessible (e.g., accessible with a 45% probability as determined by the probabilistic forecasting model) based on a prediction that traffic congestion is predicted to be moderate, no events are scheduled to occur/take place within a radius of the parking location, and no inclement weather is predicted. In this way, the server 906 predicts 906F that the parking location will be "possibly" available and "possibly" accessible when the vehicle is predicted to reach the destination.

Referring to FIG. 9B, in the depicted example, the server 520 determines that the availability of the parking location has fallen below a threshold (e.g., a predetermined threshold of 50% probability). In this scenario, when the probability of the availability of the parking location decreases below 50%, the server 906 determines that the destination of the vehicle should be changed. In an embodiment, the occupancy forecasting system 550 changes the destination of the vehicle based on the traffic congestion information. For example, if traffic congestion is present along a certain route and the occupancy forecasting system 550 determines that an alternate route can be taken but requires the parking location to be changed to an adjacent parking location, then, the occupancy forecasting system 550 changes the parking location. Similarly, in some cases, the occupancy forecasting system 550 changes the parking zone for the same or similar reasons.

In an embodiment, the server 906 determines that the destination of the vehicle should be changed based on the accessibility based on traffic congestion, scheduled events, and weather information. For example, the server 906 transmits 902B a request to the passenger (e.g., via the app on the mobile device of the passenger or via a user interface of the vehicle itself) informing the passenger of the recommended destination change. The request indicates to the passenger that the vehicle recommends changing the destination to a different destination (e.g., changing the destination from a first parking location to a different parking location) and requests 902C approval from the passenger to perform the change of the destination.

In the illustrated scenario, the passenger declines 902D the request to change the destination. The declined request is transmitted 902E to the server 520 and the server 520 maintains the original destination. In the meantime, a fourth vehicle (or the second vehicle or the third vehicle) drives 906G by the parking location of the destination, acquires status information, and transmits the status information to the server 520. The server 520, in turn, updates the future status of the parking location according to the updated status information from the fourth vehicle.

Consequently, the server 906 now predicts 906H that the parking location is predicted to be not likely to be available based on a 20% probability (e.g., by the probabilistic forecasting model). Despite this low availability, the server 906 still predicts 906H that the parking location is possibly accessible based on a prediction that traffic congestion is predicted to be moderate, no events are scheduled to occur/take place, and no inclement weather is predicted. This indicates that while the vehicle might be able to access the destination, the destination is unlikely to be available. However, because the destination is not predicted to be available, the server 906 determines that the vehicle should not attempt to drive to the destination and potentially waste time. In this scenario, the availability of the parking location decreases below a threshold (e.g., 25% probability) such that the server 520 overrides the passenger decision and instructs 904D the vehicle to proceed to a new destination with a higher probability that the destination is available and accessible relative to the current destination. The server 520 notifies 902F the passenger of this change.

Figure 10:
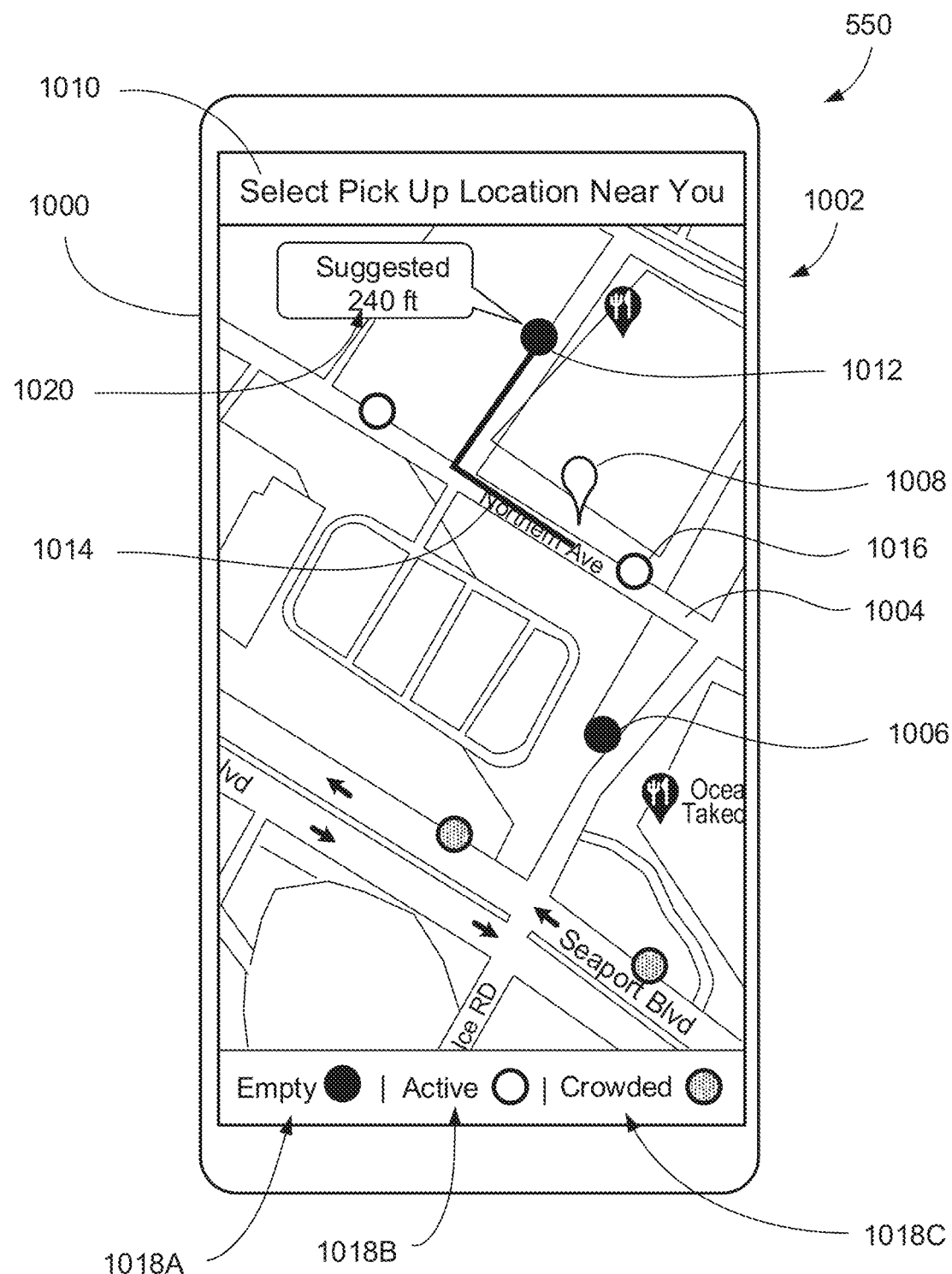
FIG. 10 shows a mobile device associated with the occupancy forecasting system of FIG. 5.

FIG. 10 shows a mobile device 1000 associated with the occupancy forecasting system 550. In an embodiment, the mobile device 1000 is similar to, or the same as, the mobile device 512 described with reference to FIG. 5. The mobile device 1000 is included within the occupancy forecasting system 550. The mobile device 1000 includes a touch-screen display or user interface 1002 that displays the roads 1004 of the environment 500 and the parking zones and/or parking locations 1006 of the environment 500. In the example shown in FIG. 10, each circle 1006 represents a distinct parking location 1006. In other examples, each circle 1006 represents a parking zone and a set of parking locations within the parking zone is viewable/selectable by the passenger by pressing on the respective parking zone on the user interface 1002. In some embodiments, an app configuration defines whether parking zones are shown on the app and are selectable by the passenger.

In an embodiment, the passenger is the passenger 510 described with reference to FIG. 5. In some examples, the passenger loads an app on the mobile device 1000 to request a vehicle to pick-up the passenger at a pick-up location. In some examples, the mobile device 1000 determines a location of the mobile device 1000 (e.g., using GPS receiver within the mobile device). In scenarios where location is determined, the mobile device 1000 displays a location marker 1008 representing the location of the mobile device 1000 on the map of the environment 500. In this way, the location of the mobile device 1000 is a proxy for the location of the passenger.

In an embodiment, the occupancy forecasting system 550 transmits information to the mobile device 1000 indicating that a request 1010 be made to the passenger so the passenger can select a pick-up location where a vehicle will pick-up the passenger. In some examples, the occupancy forecasting system 550 transmits information to the app to suggest a parking location 1012 within walking distance to the passenger (e.g., less than 1000 feet). In some examples, the suggested parking location 1012 is determined based on the predicted availability and/or accessibility status information of all parking locations within the environment 500. In some examples, the suggested parking location 1012 is determined based on stored status information and/or stored future status information within a database of the server 520. In some examples, the suggested parking location is determined in the same way as, or similar to, the destinations described above with reference to FIGS. 5-9B.

In an embodiment, the occupancy forecasting system 550 transmits information to the mobile device 1000 indicating that a walking path 1014 be displayed on the user interface 1002. In some examples, the occupancy forecasting system 550 determines the walking path 1014 based on a location of sidewalks, crosswalks, handicap accessibility, and/or whether the walking path involves indoor or outdoor travel. In some examples, the occupancy forecasting system 550 determines a distance of the walking path 1014 and displays 1020 the distance information on the user interface 1002.

In some examples, the walking path 1014 is based on a passenger preference (e.g., the passenger indicates to the app that walking is not preferred). In examples where walking is not preferred, the occupancy forecasting system 550 changes the recommendation to a parking location closer to the passenger (e.g., parking location 1016) even though the parking location is not predicted to be available when the vehicle is predicted to arrive. In this scenario, a tolerance for increased wait time for the parking location to become available is increased (e.g., the vehicle will wait in a line of vehicle to access the parking location). For example, the user interface 1002 receives an indication of a pick-up location preference from the passenger. For example, a passenger indicates (e.g., by pressing or selecting via the user interface 1002) a particular location at which the passenger would prefer to be picked-up from a vehicle. In turn, the pick-up location is based on the received pick-up location preference. In other examples, a destination preference of the passenger (e.g., the drop-off location) is selected by the passenger and the destination of the vehicle is based on the received destination preference.

In an embodiment, the occupancy forecasting system 550 transmits information to the mobile device 1000 indicating that an indication 1018A-1018C (generally an indication 1018) of the predicted future status (e.g., available and/or accessible) of one or more parking locations be displayed on the user interface 1002 along with the location of the respective parking location. For example, the occupancy forecasting system 550 automatically determines the predicted future status based on a selection of the closest available vehicle to pick up the passenger and a prediction of when that vehicle would arrive at each of the one or more parking locations within a radius of the passenger (e.g., within a 500 foot radius). For example, assuming a vehicle, the occupancy forecasting system 550 determines the predicted availability and accessibility for each of the parking locations visible on the user interface of the mobile device.

In an embodiment, the indication 1018 is indicative of whether the parking location is predicted to be empty 1018A (e.g., likely available and/or accessible), active 1018B (e.g., possibly available and/or accessible), or crowded 1018C (e.g., not likely to be unavailable and/or accessible). In some examples, the empty prediction 1018A is used to represent when the probability that the parking location is available and/or accessible is above a first threshold (e.g., above 60%). In some examples, the active prediction 1018B is used to represent when the probability that the parking location is available and/or accessible is above a second threshold and below the first threshold (e.g., between 30% and 60%). In some examples, the crowded prediction 1018C is used to represent when the probability that the parking location is available and/or accessible is below the second threshold (e.g., below 30%). In other examples, whether each parking location is safe is also determined by the occupancy forecasting system 550 and displayed on the user interface 1002.

In this way, the occupancy forecasting system 550 transmits information representing respective indications of predicted future statuses of additional parking locations (e.g., not only just the suggested parking location) to the mobile device 1000 for display on the user interface 1002. In some examples, the indications 1018 are displayed in color (e.g., red, yellow, or green) depending on whether the future status of the parking location is predicted to be available and/or accessible (e.g., not likely to be available, potentially available, and likely available, respectively). In some examples, the indications vary in marker shape, marker size, marker line weight, and/or marker color based on the predicted availability and/or accessibility denoted by the future status.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   receiving, by at least one processor, status information of a parking location for a vehicle, the status information representing an availability of the parking;
   probabilistically predicting, by the at least one processor and using a machine learning system, a future status of the parking location or a parking zone associated with the parking location at a time when the vehicle is predicted to arrive at the parking location or the parking zone based on the received status information;
   determining, by the at least one processor, a destination for the vehicle based on the predicted future status of the parking location or the parking zone, wherein determining the destination of the vehicle comprises:
      requesting authorization from a passenger or an awaiting passenger to change an original destination for the vehicle to the destination for the vehicle,
      overriding a denial of the requested authorization from the passenger or awaiting passenger based on additional status information of the parking location, and
      changing the original destination for the vehicle to the destination for the vehicle based on the overridden denial; and
   transmitting, by the at least one processor, the predicted future status of the parking location or the parking zone and the destination to a controller of the vehicle for controlling the vehicle to drive to the destination.

2. The method of claim 1, wherein the status information comprises at least one of information about an accessibility of the parking location or a congestion level of an area near the parking location.

3. The method of claim 1, wherein the status information comprises information about a parking meter associated with the parking location.

4. The method of claim 1, further comprising:
   generating a status history of the parking location based on the received status information and previously received status information.

5. The method of claim 4, wherein predicting the future status of the parking location comprises:
   predicting the future status based on the status history of the parking location.

6. The method of claim 1, wherein predicting the future status of the parking location comprises:
   predicting the future status based on a status history of an adjacent parking location.

7. The method of claim 1, wherein determining the destination of the vehicle comprises:
   determining whether to change the destination of the vehicle.

8. The method of claim 7, wherein determining whether to change the destination of the vehicle comprises:
   requesting authorization from the passenger or the awaiting passenger to change the destination of the vehicle.

9. The method of claim 8, wherein determining whether to change the destination of the vehicle comprises:
   changing the destination of the vehicle based on the requested authorization from the passenger or the awaiting passenger.

10. The method of claim 1, further comprising:
    receiving an accuracy associated with the received status information;
    wherein determining the destination of the vehicle is based on the accuracy associated with the received status information.

11. The method of claim 1, wherein receiving the status information comprises:
    acquiring the status information from at least one camera or from at least one LiDAR system.

12. The method of claim 1, wherein determining the destination of the vehicle comprises:
    providing information usable by a user interface to display an indication of the predicted future status of the parking location and respective indications of predicted future statuses of additional parking locations.

13. The method of claim 12, further comprising:
    receiving a destination location preference provided at the user interface; and
    changing the destination of the vehicle based on the received destination location preference.

14. The method of claim 1, wherein the status information represents at least one event occurring within a radius of the parking location; and
    wherein determining the destination of the vehicle is based on the at least one event occurring within the radius of the parking location.

15. The method of claim 1, wherein the status information represents at least one of a temperature, a precipitation, a wind chill, or a humidity at the parking location when the vehicle is expected to arrive at the parking location; and
    determining the destination of the vehicle is based on the at least one of the temperature, the precipitation, the wind chill, or the humidity at the parking location.

16. The method of claim 1, wherein determining the destination of the vehicle is based on a time when the status information was acquired.

17. The method of claim 16, wherein determining the destination of the vehicle is based on whether the time is indicative of daytime or nighttime based on sunrise or sunset times at the parking location.

18. The method of claim 1, wherein determining the destination of the vehicle is based on a day when the status information was acquired.

19. The method of claim 1, wherein the predicted future status corresponds to a status at least ten minutes after the status information was acquired.

20. The method of claim 1, wherein the vehicle is a first vehicle and the status information is received from a second vehicle.

21. The method of claim 1, further comprising:
controlling, by the controller, the vehicle to drive to the destination by changing a route of the vehicle based on the received status information.

22. The method of claim 1, wherein the vehicle is a first vehicle and the method further comprises:
transmitting an instruction to a second vehicle to drive to the destination and remain until the first vehicle arrives at the destination.

23. The method of claim 22, further comprising:
determining whether to provide the instruction to the second vehicle based on a historical demand for the parking location.

24. The method of claim 22, further comprising:
determining whether to provide the instruction to the second vehicle based on a passenger preference for the parking location.

25. The method of claim 1, wherein determining the destination of the vehicle is based on a preferred parking location of the passenger or the awaiting passenger.

26. The method of claim 1, further comprising:
predicting, by the at least one processor, when the vehicle arrives at the parking location or the parking zone.

27. The method of claim 26, wherein predicting when the vehicle arrives at the parking location or the parking zone comprises:
predicting when the vehicle arrives at the parking location or the parking zone based on at least one of traffic congestion, speed limits, weather, or road availability between a current location of the vehicle and the parking location or the parking zone.

28. A non-transitory computer-readable storage medium comprising at least one program for execution by at least one processor of a first device, the at least one program including instructions which, when executed by the at least one processor, cause the first device to perform operations comprising:
receiving status information of a parking location for a vehicle, the status information representing an availability of the parking location;
probabilistically predicting, using a machine learning system, a future status of the parking location or a parking zone associated with the parking location at a time when the vehicle is predicted to arrive at the parking location or the parking zone based on the received status information;
determining a destination for the vehicle based on the predicted future status of the parking location or the parking zone, wherein determining the destination of the vehicle comprises:
requesting authorization from a passenger or an awaiting passenger to change an original destination for the vehicle to the destination for the vehicle,
overriding a denial of the requested authorization from the passenger or awaiting passenger based on additional status information of the parking location, and
changing the original destination for the vehicle to the destination for the vehicle based on the overridden denial; and
transmitting the predicted future status of the parking location or the parking zone and the destination to a controller of the vehicle for controlling the vehicle to drive to the destination.

29. A first vehicle, comprising:
at least one computer-readable media storing computer-executable instructions;
at least one processor configured to execute the computer executable instructions, the execution carrying out operations including:
receiving status information of a parking location from a server or a second vehicle;
predicting a future status of the parking location or a parking zone associated with the parking location at a time when the first vehicle is predicted to arrive at the parking location or the parking zone based on the received status information;
determining a destination of the first vehicle based on the predicted future status of the parking location or the parking zone, wherein determining the destination of the first vehicle comprises:
requesting authorization from a passenger or an awaiting passenger to change an original destination of the first vehicle to the destination of the first vehicle,
overriding a denial of the requested authorization from the passenger or awaiting passenger based on additional status information of the parking location, and
changing the original destination of the first vehicle to the destination of the first vehicle based on the overridden denial; and
a controller for controlling the first vehicle to drive to the destination based on the predicted future status of the parking location or the parking zone.

\* \* \* \* \*